United States Patent
Rune et al.

(10) Patent No.: US 10,772,152 B2
(45) Date of Patent: Sep. 8, 2020

(54) SIMULTANEOUS CAMPING AND PAGING COORDINATION IN TWO DIFFERENT RADIO ACCESS TECHNOLOGIES

(71) Applicant: Telefonaktiebolaget LM Ericsson (publ), Stockholm (SE)

(72) Inventors: Johan Rune, Lindingö (SE); Icaro L. J. Da Silva, Solna (SE); Gunnar Mildh, Sollentuna (SE); Jose Luis Pradas, Stockholm (SE); Jari Vikberg, Järna (SE); Pontus Wallentin, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/301,639

(22) PCT Filed: May 17, 2016

(86) PCT No.: PCT/EP2016/061027
§ 371 (c)(1),
(2) Date: Nov. 14, 2018

(87) PCT Pub. No.: WO2017/198290
PCT Pub. Date: Nov. 23, 2017

(65) Prior Publication Data
US 2019/0281580 A1    Sep. 12, 2019

(51) Int. Cl.
*H04W 68/00*   (2009.01)
*H04W 68/02*   (2009.01)
(Continued)

(52) U.S. Cl.
CPC ......... *H04W 76/28* (2018.02); *H04L 27/2605* (2013.01); *H04W 68/005* (2013.01);
(Continued)

(58) Field of Classification Search
CPC ... H04W 68/02; H04W 76/28; H04W 68/005; H04W 68/12; H04W 72/1215; H04W 88/06; H04L 27/2605
See application file for complete search history.

(56) References Cited

U.S. PATENT DOCUMENTS

| | | | |
|---|---|---|---|
| 2005/0002370 A1* | 1/2005 | An ........................ | H04W 68/00 370/345 |
| 2010/0093378 A1* | 4/2010 | Chin ...................... | H04W 68/00 455/458 |

(Continued)

FOREIGN PATENT DOCUMENTS

WO    2013124046 A1    8/2013

OTHER PUBLICATIONS

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", Technical Specification, 3GPP TS 36.300 V10.12.0, Dec. 1, 2014, pp. 1-195, 3GPP, France.

(Continued)

*Primary Examiner* — Marisol Figueroa
(74) *Attorney, Agent, or Firm* — Coats + Bennett, PLLC

(57) ABSTRACT

The present invention relates to paging coordination in a wireless communication network that provides radio access for a terminal device via at least a first and second wireless radio access operating with different radio access technologies. The improved paging coordination is achieved by setting a common paging occasion configuration for the at least first and second radio access technologies, and paging (S130) the terminal device (10) via the first and/or the second radio access technologies according to the common paging occasion configuration.

19 Claims, 15 Drawing Sheets

(51) Int. Cl.
*H04W 68/12* (2009.01)
*H04W 72/12* (2009.01)
*H04W 88/06* (2009.01)
*H04W 76/28* (2018.01)
*H04L 27/26* (2006.01)

(52) U.S. Cl.
CPC ........... *H04W 68/02* (2013.01); *H04W 68/12* (2013.01); *H04W 72/1215* (2013.01); *H04W 88/06* (2013.01)

(56) References Cited

U.S. PATENT DOCUMENTS

| | | | |
|---|---|---|---|
| 2010/0202429 A1 | 8/2010 | Chin et al. | |
| 2012/0088501 A1* | 4/2012 | Chin | H04W 8/26 455/433 |
| 2016/0050626 A1* | 2/2016 | Chen | H04W 52/0225 370/311 |
| 2017/0099654 A1* | 4/2017 | Elsayed | H04W 52/0209 |

OTHER PUBLICATIONS

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 13)", Technical Specification, 3GPP TS 36.300 V13.3.0, Mar. 1, 2016, pp. 1-295, 3GPP.

\* cited by examiner

SIMULTANEOUS CAMPING AND PAGING COORDINATION IN TWO DIFFERENT RADIO ACCESS TECHNOLOGIES

TECHNICAL FIELD

The present invention generally relates to wireless communications, and particularly relates a method, a terminal device, a network node, a computer-readable storage medium, a computer program, and a carrier containing the computer program for paging coordination in at least two different radio access scenarios.

BACKGROUND

LTE uses OFDM in the DL and DFT-spread OFDM in the UL. The basic LTE DL physical resource can thus be seen as a time-frequency grid as illustrated in FIG. 1A where each resource element corresponds to one OFDM subcarrier during one OFDM symbol interval. In the time domain, LTE DL transmissions are organized into radio frames of 10 ms, each radio frame consisting of ten (#0-#10) equally-sized subframes of length $T_{subframe}=1$ ms, as illustrated in FIG. 1B. The resource allocation in LTE is typically described in terms of RBs, where a RB corresponds to one slot (0.5 ms) in the time domain and 12 contiguous subcarriers in the frequency domain. A pair of two adjacent RB in time direction (1.0 ms) is known as a RB pair. RBs are numbered in the frequency domain, starting with 0 from one end of the system bandwidth.

The notion of virtual resource blocks (VRB) and physical resource blocks (PRB) has been introduced in LTE. The actual resource allocation to a UE is made in terms of VRB pairs. There are two types of resource allocations, localized and distributed. In the localized resource allocation, a VRB pair is directly mapped to a PRB pair, hence two consecutive and localized VRB are also placed as consecutive PRBs in the frequency domain. On the other hand, the distributed VRBs are not mapped to consecutive PRBs in the frequency domain; thereby providing frequency diversity for data channel transmitted using these distributed VRBs.

DL transmissions are dynamically scheduled, i.e., in each subframe (see FIG. 1B) the base station (eNB) transmits control information about to which terminals data is transmitted and upon which RB the data is transmitted, in the current DL subframe. This control signaling is typically transmitted in the first 1, 2, 3 or 4 OFDM symbols in each subframe and the number n=1, 2, 3 or 4 is known as the Control Format Indicator (CFI). The DL subframe also contains common reference symbols (CRS), which are known to the receiver and are used for coherent demodulation of e.g. the control information. A DL system with CFI=3 OFDM symbols as control in a control region is illustrated in FIG. 2.

The 3GPP Rel-10 specifications for LTE/E-UTRAN have been standardized, supporting CC bandwidths up to 20 MHz (which is the maximal LTE Rel-8 carrier bandwidth). An LTE Rel-10 operation wider than 20 MHz is possible and appear as a number of LTE CCs to an LTE Rel-10 terminal. A straightforward way to obtain bandwidths wider than 20 MHz is by means of CA. CA implies that an LTE Rel-10 terminal can receive multiple CC, where the CC have, or at least the possibility to have, the same structure as a Rel-8 carrier. The LTE Rel-10 standard (3GPP TS 36.300, V10.12.0) supports up to 5 aggregated CCs where each CC is limited in the RF specifications to have one of six bandwidths namely 6, 15, 25, 50, 75 or 100 RB (corresponding to 1.4, 3 5 10 15 and 20 MHz respectively).

The number of aggregated CCs as well as the bandwidth of the individual CCs may be different for UL and DL. A symmetric configuration refers to the case where the number of CCs in DL and UL is the same whereas an asymmetric configuration refers to the case that the number of CCs is different in DL and UL. It is noted that the number of CCs configured in the network may be different from the number of CCs seen by a terminal. A terminal may for example support more DL CCs than uplink CCs, even though the network offers the same number of UL and DL CCs.

CCs are also referred to as cells or serving cells. More specifically, in an LTE network the cells aggregated by a terminal are denoted PCell and SCell. The term serving cell comprises both PCell and SCells. All UEs have one PCell and which cell is a UEs PCell is terminal specific and is considered "more important", i.e. vital control signaling and other important signaling is typically handled via the PCell. UL control signaling is always sent on a UEs PCell. The CC configured as the PCell is the primary CC whereas all other component carriers are secondary serving cells. The UE/terminal can send and receive data both on the PCell and SCells. For control signaling such as scheduling commands this could either be configured to only be transmitted and received on the PCell but where the commands are also valid for SCell, or it can be configured to be transmitted and received on both PCell and SCells. Regardless of the mode of operation, the UE/terminal will only need to read the broadcast channel in order to acquire system information parameters on the PCC. System information related to the SCCs may be provided to the UE/terminal in dedicated RRC messages.

During an initial access a LTE Rel-10 terminal (UE) behaves similar to a LTE Rel-8 terminal (UE). However, upon successful connection to the network a Rel-10 terminal (UE) may—depending on its own capabilities and the network—be configured with additional serving cells in the UL and DL. Configuration is based on RRC. Due to the heavy signaling and rather slow speed of RRC signaling it is envisioned that a terminal may be configured with multiple serving cells even though not all of them are currently used.

LTE CA supports efficient use of multiple carriers, allowing data to be sent/received over all carriers. There is support for cross-carrier scheduling avoiding the need that the UE/terminal listens to all carrier-scheduling channels at all times. The solution relies on a tight time synchronization between the carriers.

CA requires tight synchronization between the PCell and the SCell, thus essentially requiring a common location for the antenna(s) or very low latency backhaul connections between them. To enable similar benefits as in CA also for cases where different base stations and/or antenna sites are used with relaxed backhaul latency requirements, 3GPP initiated and introduced the concept called dual connectivity.

Dual connectivity is a solution currently being standardized by 3GPP to support UEs connecting to multiple carriers to send/receive data on multiple carriers at the same time. Below is an overview description taken from 3GPP TS 36.300 V13.3.0: E-UTRAN supports Dual Connectivity (DC) operation whereby a multiple RX/TX UE in a RRC_CONNECTED mode is configured to utilize radio resources provided by two distinct schedulers, located in two eNBs (base stations) connected via a non-ideal backhaul over the X2 interface. eNBs involved in dual connectivity for a certain UE may assume two different roles: an eNB may either act as a MeNB or as an SeNB. In dual connectivity a UE is connected to one MeNB and one SeNB. DC also makes it possible to send and/or receive data over all LTE carriers, without requiring tight time synchronization as in CA. This is enabled because the UE will listen to all scheduling channels on all carriers.

FIG. 3 schematically illustrates the radio user plane protocol architecture for DC. In DC, the radio protocol architecture that a particular bearer uses depends on how the bearer is setup. Three alternatives exist, MCG bearer, SCG bearer and split bearer. Those three alternatives are depicted on FIG. 3. In particular, the left side of FIG. 3 shows the user plane flow for MCG bearers arriving from the core network to the MeNB and MeNB handling this flow without SeNB involvement. The middle flow in FIG. 3 arriving from the core network to the MeNB shows the case of split bearers. In this case the received user plane flow can be handled by both the MeNB and the SeNB. The right side of FIG. 3 shows the user plane arriving to the SeNB for SCG bearers and SeNB handling this flow. SRBs are always of the MCG bearer and therefore only use the radio resources provided by the MeNB. It is further noted that DC may also be described as having at least one bearer configured to use radio resources provided by the SeNB.

Inter-eNB control plane signaling for dual connectivity is performed by means of X2 interface signaling via the X2 network interface, as shown in FIG. 3. Further, control plane signaling towards the MME is performed by means of S1 interface signaling, as further illustrated in FIG. 4A. There may be only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells. Any required coordination between MeNB and SeNB is performed by means of the X2 interface signaling. FIG. 4A shows C-plane (control plane) connectivity of eNBs involved in dual connectivity for a certain UE, and the MeNB is C-plane connected to the MME via S1-MME, the MeNB and the SeNB are interconnected via X2-C.

FIG. 4B schematically illustrates U-plane (user plane) connectivity of eNBs involved in dual connectivity for a certain UE. Here, the U-plane connectivity may depend on the bearer option configured. For MCG bearers, the MeNB is U-plane connected to the S-GW via S1-U and the SeNB is not involved in the transport of user plane data. For split bearers, on the other hand, the MeNB is U-plane connected to the S-GW via S1-U and in addition, the MeNB and the SeNB are interconnected via X2-U. For SCG bearers, the SeNB is directly connected with the S-GW via S1-U.

SUMMARY OF THE INVENTION

Problems with Existing Solutions

Paging is used in LTE to locate and contact a terminal device such as UE, an MTC device, a wireless terminal device or the like which does not have any RRC connection established with the network. To limit the area in which a UE has to be paged, the UE may be (individually) configured with an area in which the UE can move around without informing the communications network of its whereabouts. In LTE such an area may be a list of tracking areas. When moving into a tracking area which is not included in the list, the UE has to report this to the network through a Tracking Area Update Request message, which informs the network of the UE's location and triggers it to assign a new tracking area list to the UE. Here, a general term for such an area where the UE can move around without information the network is "registration area".

With this coarse tracking of the UE the location uncertainty of the UE is limited to the area covered by the UE's list of tracking areas and hence the area in which the UE potentially has to be paged is limited in the same manner. To further reduce the number of cells a UE is paged in, the communication network may apply smart, sequential paging schemes where the UE initially is paged in a smaller area which is widened only if no response is received. For instance, the UE can be paged initially only in its last known cell and then, if no response is received, in its entire registration area.

Paging is usually initiated from the core network. In LTE the MME sends a S1AP Paging message to each eNB to participate in the paging and this triggers the eNB to send an RRC Paging message to the terminal device (UE). A paging message is sent on the PDSCH just like any other higher layer control plane message or user plane message. A difference from other messages is that it is addressed to a certain RNTI, the Paging RNTI (P-RNTI), which all UEs can listen for on the PDCCH. The actual RRC Paging message on the PDSCH includes an identifier in a paging record indicating which UE the page is directed to. Paging information for the UE is being carried on the PDSCH in the resource blocks indicated by the PDCCH. The same RRC Paging message may include multiple paging records and hence address multiple UEs simultaneously. To respond to the paging the terminal device (UE) may perform a random access procedure and may send a NAS Service Request message to be forwarded by the eNB to the MME.

For the purpose of conserving energy to reduce the UE's power consumption the UE does not have to monitor the PDCCH for the P-RNTI continuously. Instead, it is configured with certain paging occasions where a paging may be performed (for example every 60 ms or 100 ms) and in between these paging occasions the UE may enter a low-power mode (i.e. it employs idle mode DRX or paging DRX in RRC_IDLE state). UEs in this idle mode monitor the PDCCH channel for P-RNTI used for paging to receive paging message from eNB. The UE may enter into a high-power mode to monitor the PDCCH only at certain UE-specific paging occasion, i.e. only at specific subframe in specific radio frame. At other times the UE may go into the low-power sleep mode to save battery power.

The actual time slots (of corresponding sub-frames and frames) constituting the paging occasions may be derived from an algorithm whose input consists of cell specific parameters (which may be indicated in the broadcasted system information), a part of the terminal device's (UE's) permanent identity (IMSI modulo 1024) and an optional UE specific paging DRX cycle length. Here, the DRX cycle length may indicate the number of radio frames in the paging cycle. A consequence of the cell specific parameters is that the paging occasions will be different in different cells. This in turn means that the UE has to detect that it has moved to a new cell (i.e. reselection of the cell to camp on) and acquires the system information in each new cell, in order to be able to apply its paging DRX and only monitor the correct time slots. The output of the paging occasion algorithm therefore determines which radio frames of a frame cycle length (i.e. the time or number of radio frames until the frame number wraps around which is, e.g., respectively 10.24 seconds and 1024 radio frames in LTE) the paging occasions occur in (denoted paging radio frames) as well as which of the subframe(s) within each paging frame that constitute a paging occasion.

The possibility for tight integration between an evolved LTE and a new RAT (referred to as NX or NR (New Radio) in the following and currently being discussed as new radio access technology in 5G) has great potential for introduction of new beneficial concepts. A particular problem in the context of camping and paging (also) in 5G systems is related to the assumed ability of a terminal device (UE) to use several RATs and/or network layers simultaneously and to move freely between them. This ability may be utilized to ensure that a terminal device (UE) always has coverage of some or at least one RAT (or network layer) and that the most beneficial one (based on various criteria) may always be chosen. However, moving between different RATs and/or network layers, or using them simultaneously, while in idle mode (or any other dormant/sleeping state) has the technical complication that it may become less power-efficient especially when there is no coordination between the several RATs. In addition, the terminal device (UE) side implementation may face other challenges if the idle mode actions or paging DRX mode actions to be performed by the terminal device (UE) in the different RATs collide e.g. in time.

That is, when the network has to reach the terminal device (UE), e.g. to deliver incoming DL data, it pages the UE and then the network has to be aware of the limited area where the UE should be reachable for paging. Hence, if the UE is to be allowed to move freely between the RATs, it has to be available for paging in either RAT, without having to inform the network of which the current RAT is (which reduces energy consumption). Here, the terminal device (UE) may monitor the radio interface for paging in both RATs simultaneously (dual-radio UE) or, optionally and depending on UE capabilities and the coverage situation, only in one of the RATs at a time. To save energy in the UE, a UE in idle mode only has to listen for pages during specific occasions, while it can remain in a lower power (non-monitoring) mode (i.e. sleep mode) in between these paging occasions. This concept is known as paging DRX mode. With the current paging mechanisms the occurrences of the paging occasions are governed by a paging DRX algorithm which takes system parameters (and possibly UE specific parameters) as its input. These parameters are RAT specific and, at least in LTE, cell specific. The difference in paging occasion algorithms between the different RATs and between cells of the same RAT hence counteracts the energy saving purpose of the paging DRX scheme, since the resulting non-coinciding paging occasions will require the UE to leave the low power mode more often.

There is therefore a need to reduce the energy consumption of the terminal device in the case of camping and paging on at least two different wireless radio access technologies (RATs).

Solution

Accordingly, it is an object of the present invention to solve the above described problems. In particular, it is an object of the present invention to overcome the above-described limitations that result from increased energy consumption of the terminal device in case of simultaneous paging in at least two different radio access technologies. To overcome the disadvantages of the above described disadvantage the present invention introduces a mechanism for coordination of the paging occasions across the two RATs and/or across multiple cells of the same RAT.

Suitable methods, a network node, a terminal device, a computer-readable storage medium, a computer program, and a carrier containing the computer program are defined in the independent claims. Advantageous embodiments are defined by the dependent claims.

In one embodiment, a method is defined in a wireless communication network, said wireless communication network providing radio access for a terminal device via at least a first and second type of wireless radio accesses operating with different radio access technologies, wherein the method comprises the steps of: setting a common paging occasion configuration for the at least first and second radio access technologies; and paging the terminal device via the first and/or the second radio access technologies according to the common paging occasion configuration.

In a further embodiment, a method is defined in a terminal device accessible via at least a first and second type of wireless radio accesses operating with different radio access technologies, wherein the method comprises the steps of: obtaining a common paging occasion configuration setting for the at least the first and second radio access technologies; and operating the terminal device to receive a paging via the first and/or the second radio access technologies according to the common paging occasion configuration.

In another embodiment, a network node and a terminal device are respectively defined which are adapted to perform the above methods. In still further embodiments, a corresponding computer-readable storage medium, computer program, and carrier containing the computer program are defined.

The proposed solution better exploits the potential benefits of integration between two different RATs (e.g., LTE and NX/NR) in the area of idle mode behavior or any other sleeping/dormant mode in which the terminal device monitors paging occasions. It allows a terminal device to more efficiently camp simultaneously on both LTE and NX/NR, while maintaining a consistent paging DRX schedule across the two RATs, which is beneficial, for example, in terms of the energy consumption of the terminal device.

BRIEF DESCRIPTION OF THE DRAWINGS

The embodiments herein will now be further described in more detail in the following detailed description by reference to the appended drawings illustrating the embodiments and in which.

DETAILED DESCRIPTION

Figure 1A:
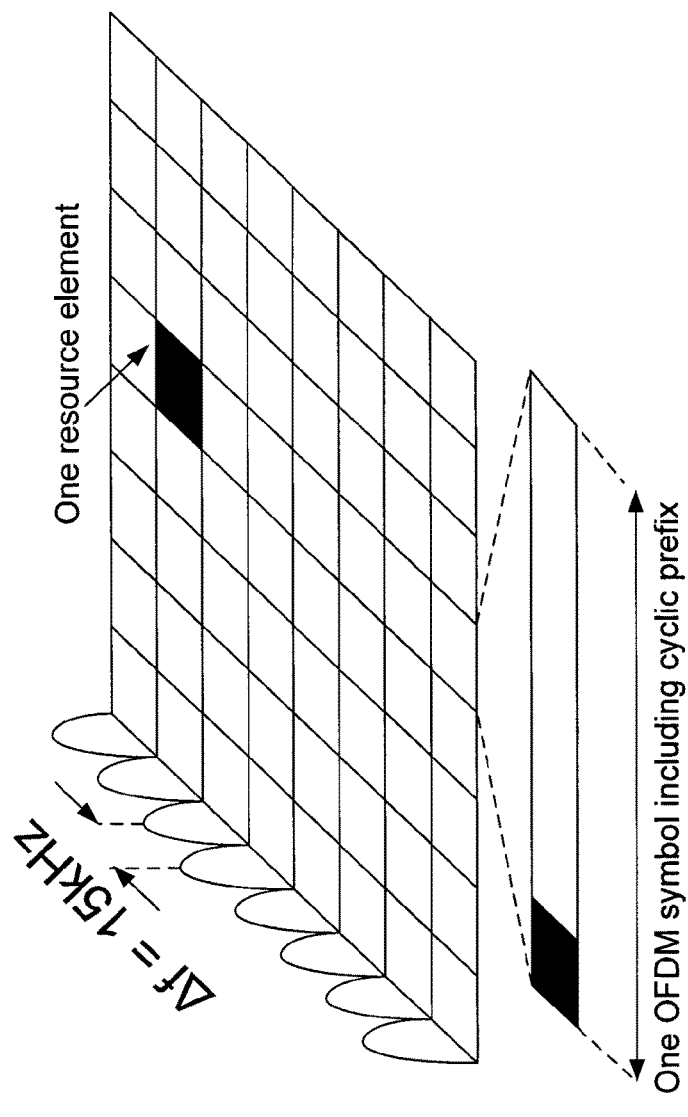
FIG. 1A schematically illustrates an LTE downlink physical resource.
Figure 1B:
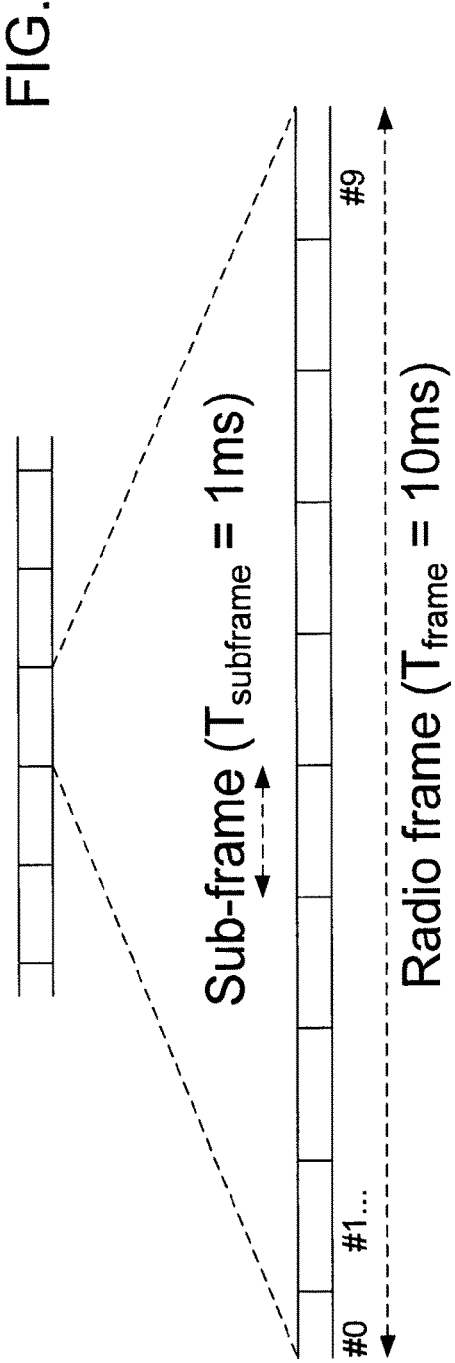
FIG. 1B schematically illustrates an LTE time-domain structure of a radio frame in DL transmissions.
Figure 2:
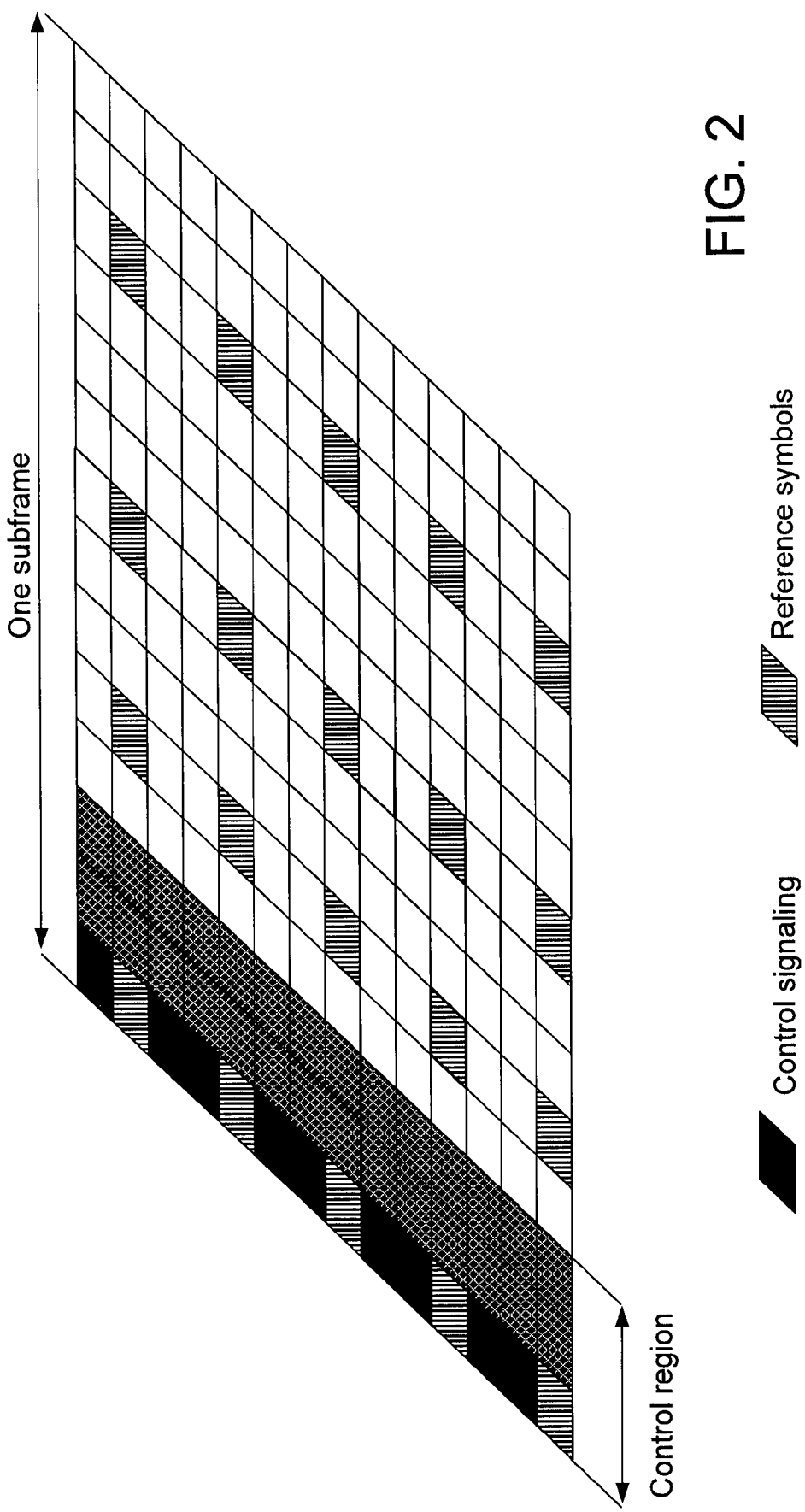
FIG. 2 schematically illustrates a DL subframe having a CFI with 3 OFDM symbols.
Figure 3:
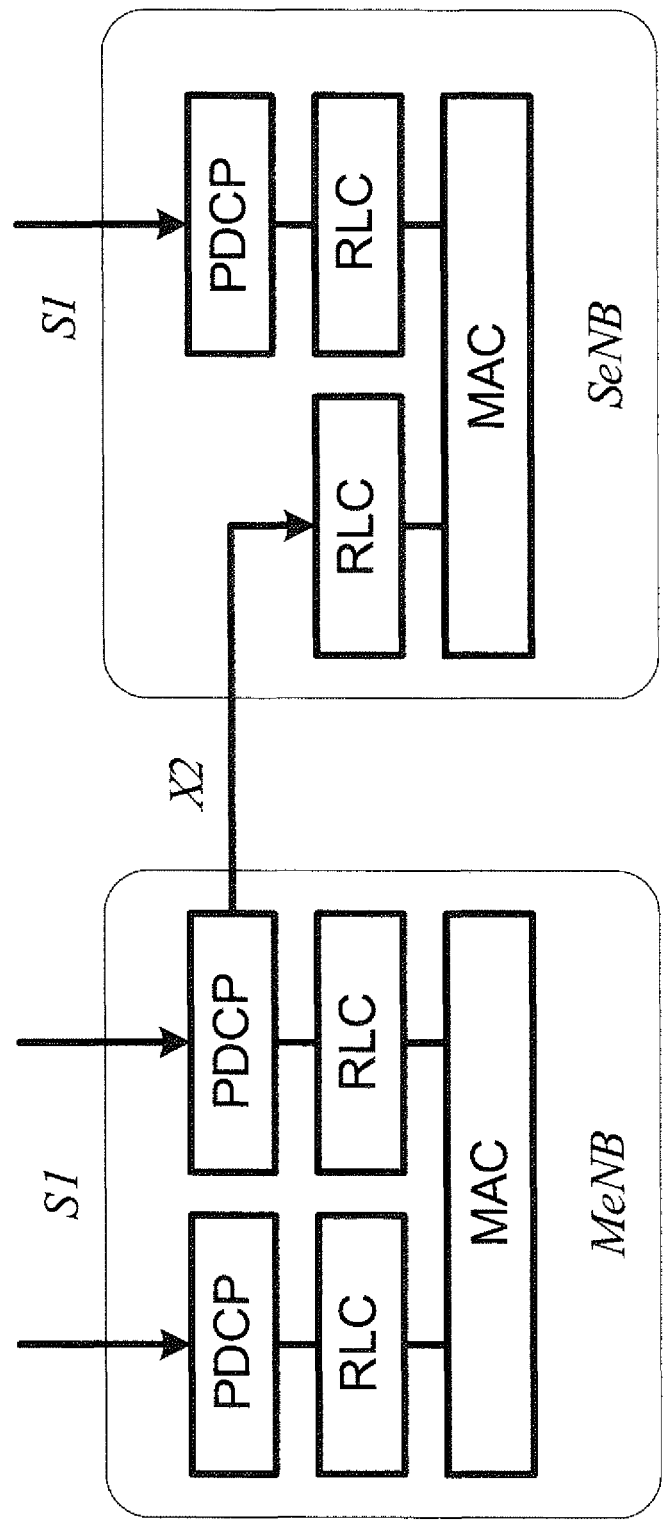
FIG. 3 schematically illustrates the radio user plane protocol architecture for dual connectivity.
Figure 4B:
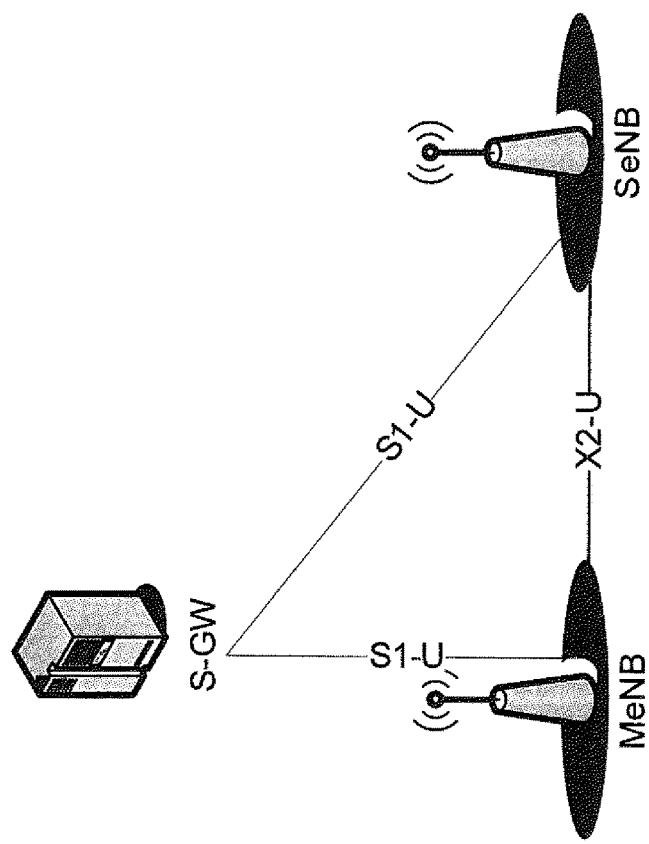
FIG. 4B schematically illustrates user plane connectivity of eNBs involved in dual connectivity.
Figure 4A:
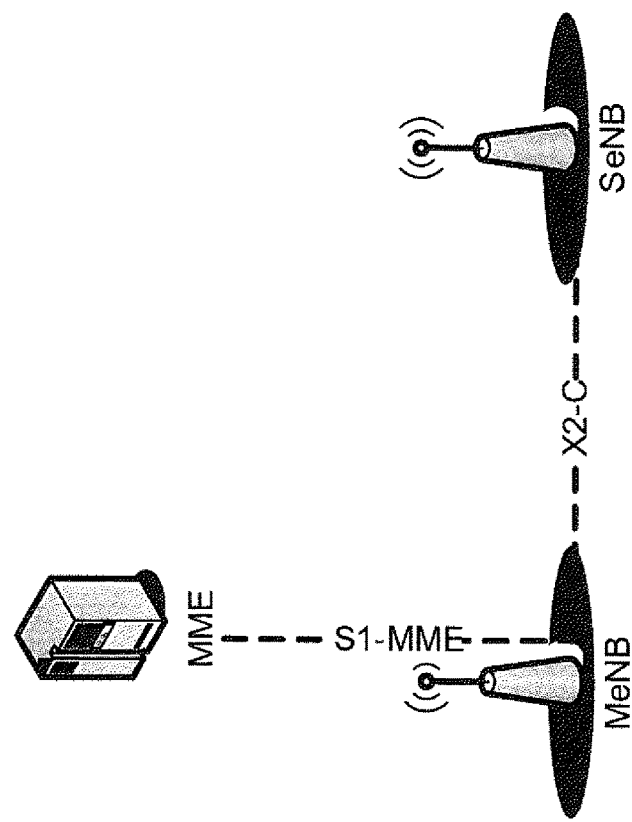
FIG. 4A schematically illustrates control plane connectivity of eNBs involved in dual connectivity.

In the following, embodiments are described with reference to the appended Figures. It is noted that the following description contains examples only and should not be construed as limiting the invention. A person skilled in the art will recognize additional features and advantages upon reading the following detailed description. Further, similar or same reference signs indicate similar or same elements or operations.

Embodiments of the present invention facilitate having a terminal device (UE) to simultaneously camp on at least two different wireless radio access technologies (RATs) when an interworking or integration between the two RATs is employed to increase the flexibility for the UE to move around the coverage of different RATs without having to update the network when it moves from one RAT to another. Here, the terminal device (which is also referred to as UE in the following) may be a mobile or a fixed terminal device. The terminal device is a wireless terminal device, and may be a (fixed or mobile) user device (UE) or a MTC device, for example a "self-driving car", capable of having a radio access over at least two different radio access technologies to one more base station (eNB). Further, the base station is a radio access network node of a wireless communication network, in particular a radio access node for providing a radio access to the terminal device, and also has a coverage area (including based on the beam-forming process, as described above) in which it may provide the radio access. It is also noted the base station may also support multiple radio accesses, such as the LTE Evolution radio access technology and the 5G radio access technology (NX/NR). Such a radio access may be of any spectrum or standard (GSM, GPRS, 3G, 4G, LTE, 5G, NX, WiFi, even DECT, etc.). Furthermore, the radio access network (RAN) node may be connected with a core network node (such as the MME) and/or other RAN nodes, as explained above.

The present invention comprises a concept in which paging occasions are synchronized in the two (or multiple) RATs so that a common paging occasion configuration (a common paging DRX configuration) is used which is common to (across) the at least two different RATs. The overall power consumption of the terminal device (UE) for the paging DRX may thus be optimized.

Moreover, the difference in the frame lengths of the at least two different RATs may be accounted for by different mechanisms for derivation of the respective paging occasions which are still synchronized within the common paging occasion configuration. Further, for a dual-radio terminal device (UE) which can monitor and receive DL transmissions in both the different RATs simultaneously the paging occasions coincide in the two RATs, while for a terminal device (UE) which can only monitor and receive DL transmissions in one RAT at a time, the paging occasions are spaced apart with a time interval allowing the terminal device (UE) to switch between the two RATs to be able to monitor the paging occasion in both RATs within the common paging occasion.

The present invention further includes mechanisms by which the core network (or an anchor node in the RAN in case of RAN internal paging) instructs a radio access network node to page the terminal device (UE) so that synchronized paging occasions within the common paging occasion configuration are achieved.

The present invention further includes mechanisms for cases in which there is no synchronization of frame numbers between the different RATs, wherein the mechanisms support the terminal device possibilities to locate the paging occasions of the common paging occasion configuration in terms of information about frame number differences.

The present invention further includes a mechanism for a common paging coordination across the different RATs, where the mechanism takes into account, at least in part, non-RAT specific properties. Examples of such properties may include UE traffic behavior, subscription data received from a Home Subscriber Server (HSS), configured network operator preferences, or that the paging DRX cycle (i.e. the interval between paging occasions) may be defined in terms of absolute time instead of RAT-specific time units, such as frames or subframes.

Furthermore, the common coordination aspect calls for a paging DRX period that is tied to the UE rather than the cell or RAT. Note that the common paging DRX period may be configurable and may be reconfigured more or less any time and may thus vary. The point is that it is (overall) the same common paging occasion configuration across the RATs and cells.

The present invention further includes a mechanism by which the communication network side (for example, MME, eNB) and the terminal device (UE) agree on the common paging occasion configuration and remain synchronized between them. On the network side such management of the UEs in the idle (dormant, sleep or other lower-power) mode may be handled by a control plane, which may be common for multiple RATs, e.g. radio access of LTE and the 5G radio access technology (NX/NR). On the other hand, the UE either has to maintain a stable enough clock to keep track of the intervals through dead reckoning or be able to adjust its synchronization through an energy efficient mechanism, preferably aided by the network. For an efficient UE DRX sleep mode the paging occasions of the common paging occasion configuration should be consistent across RATs, RAT nodes (e.g. eNBs) and cells.

Figure 5:
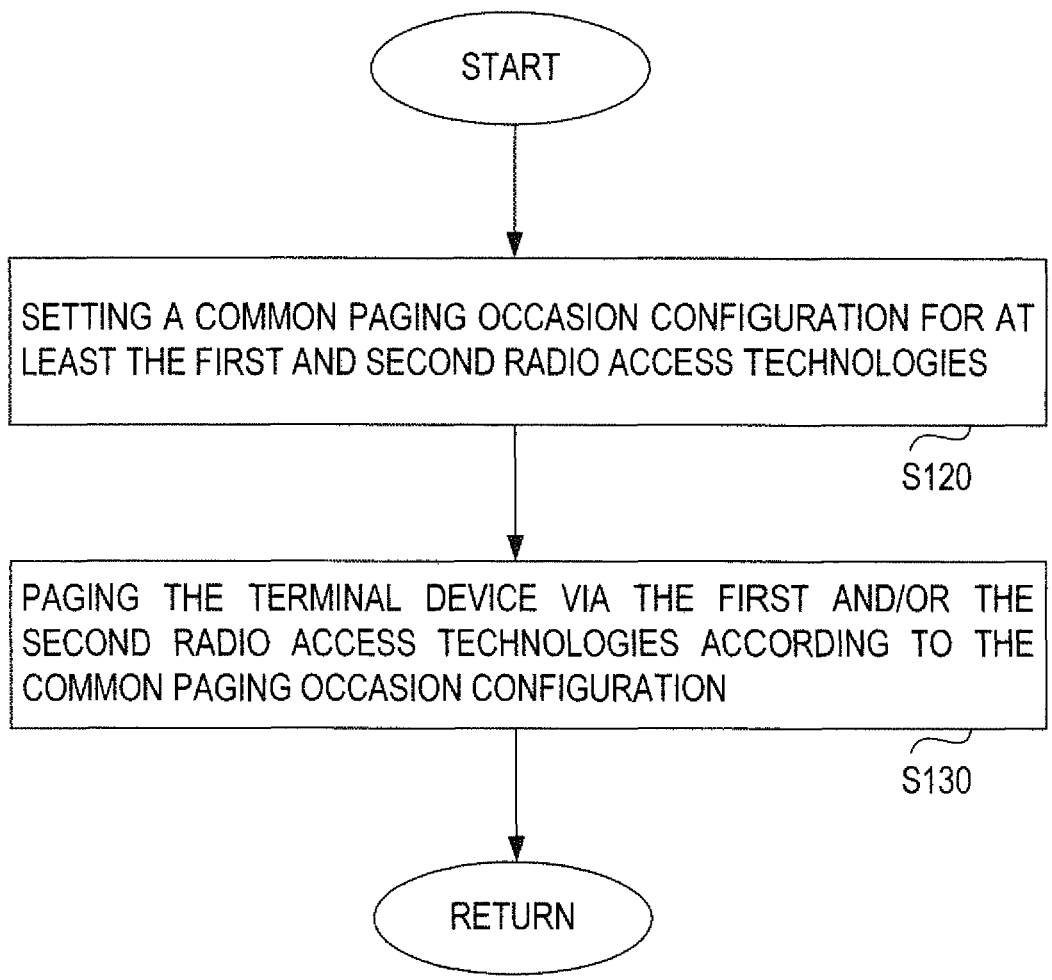
FIG. 5 is a schematic flow diagram illustrating an embodiment of a method for paging coordination between two different RATs in a communication network.

FIG. 5 illustrates an embodiment of a method for facilitating a paging coordination in a wireless communication network that provides radio access for a terminal device 10 via at least a first and second type of wireless radio accesses operating with different radio access technologies (RATs). A non-limiting example of the two different radio access technologies for this and all other embodiments is LTE and the 5G radio access technology (NX/NR). As shown in FIG. 5, the method includes a step S120 in which a common paging occasion configuration is set for the at least first and second RATs, and further includes a step S130 in which the terminal device 10 is paged via the first and/or second RAT according to the set common paging occasion configuration.

The setting of the common paging occasion configuration may be performed by a network node 50, for example a core network node or a radio network node, which generates a paging occasion configuration that is common for the two different RATs and provides a paging coordination in the two different RATs. Here, the set common paging occasion configuration may be transmitted to one or more radio access network (RAN) nodes $30_1$, $30_2$ which further transmit it to the terminal device 10. As such, a synchronized common paging occasion configuration is generated between the network side and the terminal device (UE) side.

Here, the set common paging occasion configuration is a paging configuration that is common for the two different RATs and hence provides a synchronized/coordinated paging configuration across the different RATs or across cells. As will be further explained below, the common paging occasion configuration defines a common paging time period (common time slots) that is used to page the terminal device 10 by both the first and second RATs. Alternatively, the set common paging occasion configuration may be used for a first and second cell of the same RAT where a common paging time period is used for paging the terminal device 10 via the first and second cell.

The paging of the terminal device 10 in step S130 may, for example, be initiated from a core network node 50 (e.g., from the MME) or another network node, which triggers a RAN node $30_1$, $30_2$ (eNB) to send a paging message to the terminal device 10 according to the set common paging occasion configuration, e.g. during the common paging time period which is used for both the first and second RAT. As explained above, the paging message may be a RRC paging message on PDSCH. In one embodiment, a first RAN node $30_1$ (related to a first RAT) and a second RAN node $30_2$ (related to a second RAT) hence page the terminal device 10 during a common paging time period when a need arises to reach the terminal device 10.

As will be further described below, the setting of the common paging occasion configuration and/or the corresponding paging of the terminal device 10 may be performed in accordance with UE-specific capabilities and/or a specific coverage situation. In particular, the setting/generation of the common paging occasion configuration may be based on at least one of UE-specific capabilities, UE traffic behavior, subscription data received from a Home Subscriber Server (HSS), and/or on configured network operator preferences, as will be further described below.

The above set common paging occasion configuration may define a repetitively occurring common wake period of the terminal device 10 for the different RATs. Here, the repetitively occurring common wake period may be defined with regard to a common paging cycle. Such a (repetitively occurring) common wake period may set a single time period according to which the terminal device 10 switches once from a lower-powered state (non-monitoring, sleep mode) into a higher-powered state and back to the lower-powered state, and the higher-powered state of this single common time period may be commonly used for paging via the first and second RAT. The present generation of a common paging occasion configuration is therefore in difference to two uncoordinated paging occasions in the two RATs which would use a first wake period for a first RAT and a different second wake period for a second RAT and in which the terminal device 10 would have to wake up twice. The above set common paging occasion configuration may further define a repetitively occurring common sleep period of the terminal device 10. Such a common sleep period is hence a (coordinated) single time period in between two common wake periods (as described above). As such, energy savings at the terminal device 10 are optimized due to the applied paging coordination in which the terminal device only has to wake up once for both RATs.

In a further embodiment, the set common paging occasion configuration may define a first paging time unit, for example a first number of paging time slots, for the first RAT and a second paging time unit, for example a second number of paging time slots, for the second RAT. The respective time units are sufficient for the terminal device 10 to successfully receive a paging message via the respective RAT. Here, the first paging time unit and the second paging time unit are advantageously arranged such that the common wake period of the terminal device has a minimum duration. This may be achieved, for example, by a sufficiently large overlap (in absolute time) of the first and second time units. In other words, the common paging occasions within the common wake period occur as close to each other (in absolute time) as possible. The minimum duration of the common wake period therefore guarantees a minimum energy consumption of the terminal device 10.

In a preferred embodiment, the first paging time unit and the second paging time unit of the common paging occasion configuration occur simultaneously. Based on such a configuration, paging of the terminal device 10 via the two different RATs occurs simultaneously during the common wake period. Here, the common paging occasion configuration may, for example, define simultaneous paging time slots for both the first and the second RAT. Such a configuration should be preferably applied for a terminal device 10 having dual radio access capabilities which may monitor and receive DL transmissions in both RATs simultaneously.

In another preferred embodiment, the first paging time unit and the second paging time unit of the common paging occasion configuration are separated only based on a guard time interval. Such a configuration should be preferably applied for a terminal device 10 having single radio access capabilities which may not monitor and receive DL transmissions in both RATs simultaneously. Here, the separation of the first paging time unit and the second paging time may be defined by different start times of, e.g., the respective time slots, and are thus spaced apart but still occur within the common wake period. For a terminal device 10 which can only monitor and receive DL transmissions in one RAT at a time, the above guard time defines a time interval which allows the terminal device 10 to switch between the two RATs and thus to subsequently monitor the paging occasions in both RATs. Here, the switching may involve a switching of a receiver to another frequency band and acquiring a synchronization, unless a synchronization had been required so recently that it may still be considered valid (which may depend on the stability/accuracy of the internal clock of the UE). The guard time interval may be UE specific, and thus the setting of the guard time interval of the common paging occasion configuration applies a UE-specific guard time interval. A UE specific guard time may be derived from UE capabilities information previously signaled from the UE to the network, from subscriber data or based on an explicit request from the UE, e.g. before entering RRC_IDLE state (or some other energy-saving state where paging and paging DRX is applied) In another embodiment, a standardized guard time interval will be used that is applicable to a plurality of UEs. Based on such a common paging occasion configuration that applies a guard time interval within the common wake period, paging may first be performed via the first RAT, then the UE performs a switching process in the guard time interval, and then paging may subsequently be performed via the second RAT.

Figure 6:
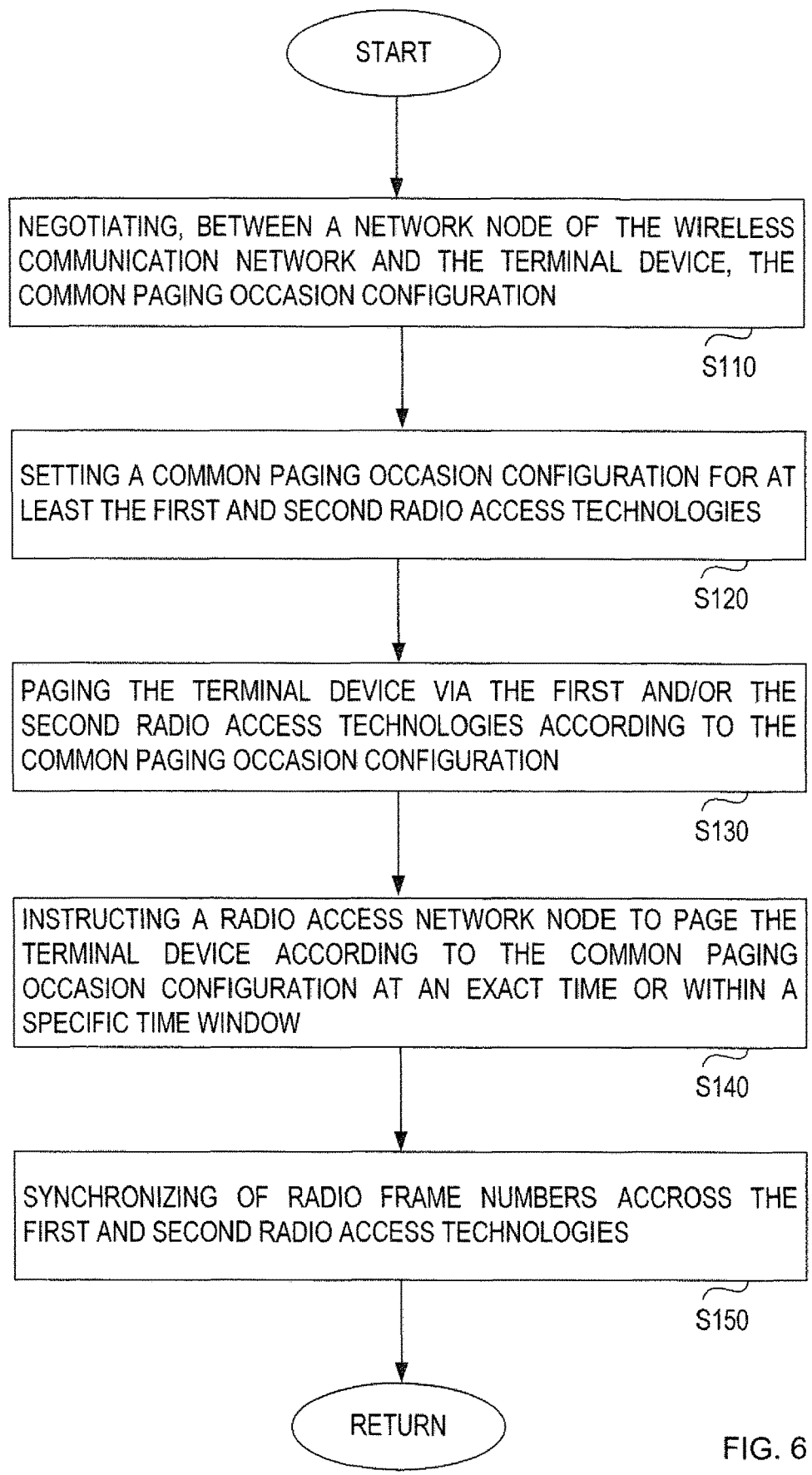
FIG. 6 is a schematic flow diagram illustrating another embodiment of a method for paging coordination between two different RATs in a communication network.

FIG. 6 illustrates another embodiment of a method for facilitating a paging coordination in a wireless communication network that provides radio access for a terminal device 10 via at least a first and second type of wireless radio accesses operating with different radio access technologies (RATs). It is noted that the method according to FIG. 6 includes the method steps S120 and S130 as already explained above.

According to step S110 of FIG. 6 a negotiation process is performed between a network node 50 (such as a core network node or another network node connected to the RAN nodes $30_1$, $30_2$) before setting the above common paging occasion configuration in step S120. Such a negotiation process may be performed, for example, during the attach procedure and/or the tracking area update procedure. During the negotiation process, the terminal device 10 may propose a common paging occasion configuration, e.g. based on information stored in the terminal device or other parameters (being related to the capabilities of the terminal device) as will be further illustrated below, which may or may not be changed by the network node 50 according to data and/or criteria available at the network node 50. During this negotiating process, the RAN nodes $30_1$, $30_2$ may remain "transparent" and thus merely follows orders from the CN as to the finally set common paging occasion configuration.

The setting of the common paging occasion configuration, for example as a result of the above negotiating process, may further be based on a difference in radio frame length between the first and second radio access technologies, as will be further described below.

The setting of the common paging occasion configuration may further be based on a stability of an internal clock of the terminal device 10. In particular, the internal clock of the terminal device 10 cannot be assumed to be perfectly stable and may thus drift in relation to the timekeeping in the network. Waking up from the lower-powered sleep mode to sample time information (to re-synchronize a drifting clock) or to calculate paging occasions should hence be avoided to the extent possible, because it counteracts the energy saving purpose of the paging DRX mode. As different terminal devices typically have different qualities of the internal clock in terms of stability, the common paging occasion configuration is preferably set accordingly. For example, the terminal device wakes up from the common sleep period in advance with a sufficient margin in order to adapt its behavior based on the stability of the internal clock. Here, the information with regard to the internal clock stability may be conveyed to the network node 50, for example during the negotiating process S110.

According to step S140 of FIG. 6 the radio access network node(s) $30_1$, $30_2$ is (are) instructed by the core network node (e.g. MME) 50 or by another network node (e.g. a so-called anchor network node) to page the terminal device 10 according to the set common paging occasion configuration at an exact time or within a specific time window. It is noted here that for the 5G RAT a RAN controlled state may be considered according to which the paging is controlled and initiated by a RAN node (the so-called anchor node where information associated with the UE is stored), which instructs other RAN nodes to page the UE (and may typically take part in the paging of the UE itself too). The paging at an exact time, by using a time reference common to the network node 50 and the RAN node $30_1$, $30_2$, provides the highest energy saving potential as the single common wake time may be very short. The common paging within a specific time window, on the other hand, allows for some flexibility at the RAN node(s) $30_1$, $30_2$, which is advantageous if the RAN node(s) $30_1$, 30 have restrictions regarding which time slots may be used for paging.

According to step S150 of FIG. 6 the radio frame numbers across the first and second radio access technologies are further synchronized within the communication network. Such a synchronization of frame numbers simplifies the usage of a frame number based paging occasion algorithm and the setting of the common paging occasion configuration, since the terminal device 10 may assume a consistent frame numbering throughout the registration/paging area and does not have to take into account that the phase of the respective frame number cycle may shift arbitrarily when the UE moves between cells or radio access nodes. Here, the synchronizing step S150 of the radio frame numbers may, for example, be based on an association of a first time unit (e.g., $TTI_{LTE}$) in the first RAT (LTE) with a second time unit (e.g., $TTI_{NX}$) in the second RAT (RAT-2, NX/NR) based on the following condition $$TTI_{LTE} = k \times TTI_{NX} \quad (1)$$

in which the first and second time units (TTIs) are related by an integer k. Taking the above association into account, when radio frame numbers across the first and second radio access technologies are synchronized, the terminal device 10 may determine a respective frame numbering for the first and second RAT and thus correctly observe the common common paging occasion configuration for both RATs.

The synchronizing step S150 of the radio frame numbers may be further based on equal radio frame cycles in both the first and second RAT or may be further based on a same number of radio frames in both radio frame cycles of the first and second RAT. This will be further explained below with regard to FIGS. 12A and 12B.

Figure 7:
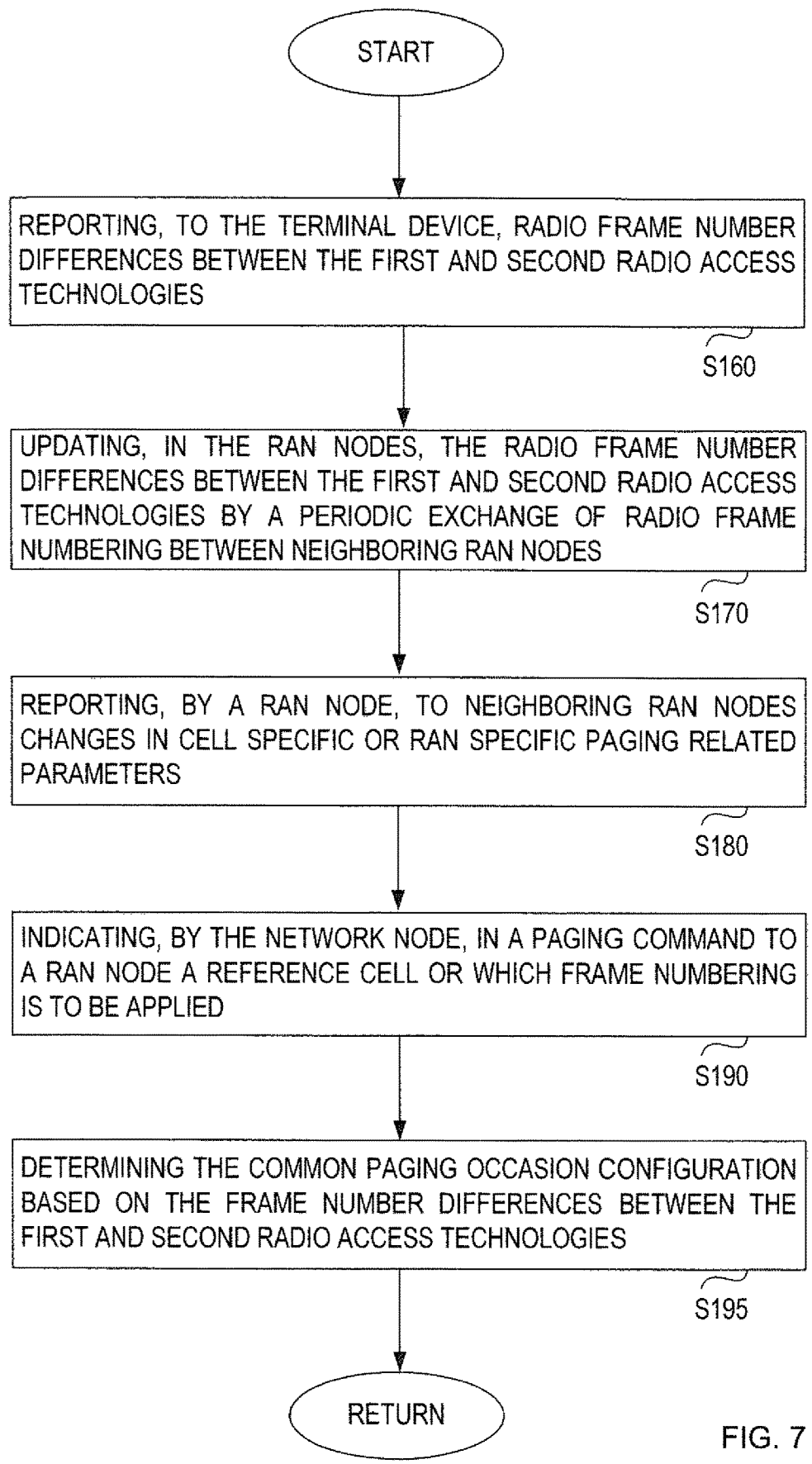
FIG. 7 is a schematic flow diagram illustrating another embodiment of a method for paging coordination between two different RATs in a communication network.

FIG. 7 illustrates another embodiment of a method for facilitating a paging coordination in a wireless communication network that provides radio access for a terminal device 10 via at least a first and second type of wireless radio accesses operating with different radio access technologies (RATs), in particular when there is no synchronization of radio frame numbers across the first and second RAT.

According to step S160 of FIG. 7, radio frame number differences between the first and second RAT are reported to the terminal device 10. Here, the radio frame number differences may, for example, be transmitted from the RAN node(s) $30_1$, $30_2$ to the terminal device 10 in a connected stated (RRC_CONNECTED), or may be provided from the network node 50 (e.g., the CN) to the terminal device 10 in conjunction with a location update, in particular when no synchronization of frame numbers across the first and second RATs is applied. Such a reporting of radio frame number differences may further include information at the level of fractions of a radio frame, i.e. differences on the level of the subframe or even less which may provide a higher accuracy in the distributed information. Such a reporting may be based on, for example, the Automatic Neighbor Relation (ANR) mechanism as will be further described below.

According to step S170 of FIG. 7, the radio frame number differences between the first and second RAT may be further updated/determined based on a periodic or randomly instructed exchange of a respective radio frame numbering between neighboring RAN nodes $30_1$, $30_2$, as will be further described below. In conjunction with the step S170, a RAN node $30_1$ may further report in step S180 to a neighboring RAN node $30_2$ changes with regard to cell-specific or RAN-specific paging related parameters which may be taking into account when determining the paging occasions of the common paging occasion configuration. The above information may be transmitted in the system information that is broadcasted in the communication network.

Further, according to steps S190 and S195 according to FIG. 7, the network node 50 may further indicate, in a paging command to a RAN node $30_1$, $30_2$, a reference cell or a reference RAN node which frame numbering is to be applied when determining the common paging occasion configuration based on the frame number differences between the first and second RATs. As such, even though there is no frame numbering synchronization within the communication network, suitable mechanism(s) are provided to indicate the actual frame number differences (phase differences) and to thus be able to apply the set common paging occasion configuration that uses a single common wake period at the terminal device for monitoring both the first and second RAT.

Figure 8:
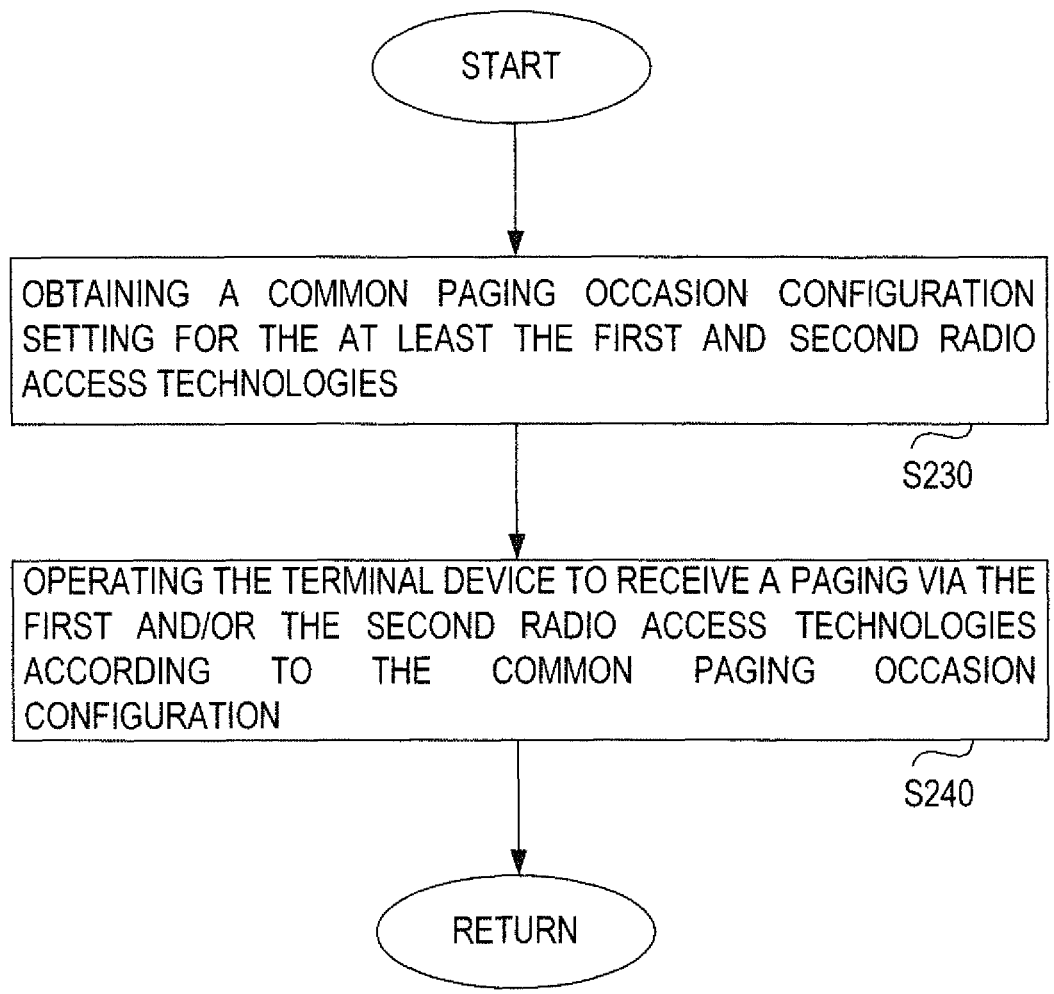
FIG. 8 is a schematic flow diagram illustrating an embodiment of a method for paging coordination between two different RATs in a terminal device.

FIG. 8 illustrates an embodiment of a paging method in a terminal device that is accessible via at least the first and second RAT.

As shown in FIG. 8, the method includes a step S230 for obtaining, at the terminal device 10, a common paging occasion configuration setting that has been explained above. Here, the terminal device 10 may receive an instruction as to the common paging occasion configuration in the two RATs, for example as it has been determined and set by the network node 50 (on the basis of the above negotiation process) in order to obtain the common paging occasion configuration setting. Alternatively, an internally stored common paging occasion configuration setting may be obtained. As explained above, the common paging occasion configuration defines whether the coordinated paging occasions are cascaded (i.e. time-shifted with the guard period in between) within the common wake period or are overlapping in time. The terminal device 10 may thus use prepare a setting according to the common paging occasion configuration.

According to step S240 of FIG. 8, the terminal device 10 is further operated to receive a paging message via the first and/or second RAT according to the set common paging occasion configuration. That is, the obtained common paging occasion configuration defines a (repetitively occurring) common wake period in which the terminal device 10 switches from a lower-powered state into a higher-powered state to receive a paging of both the first and second RAT.

Figure 9:
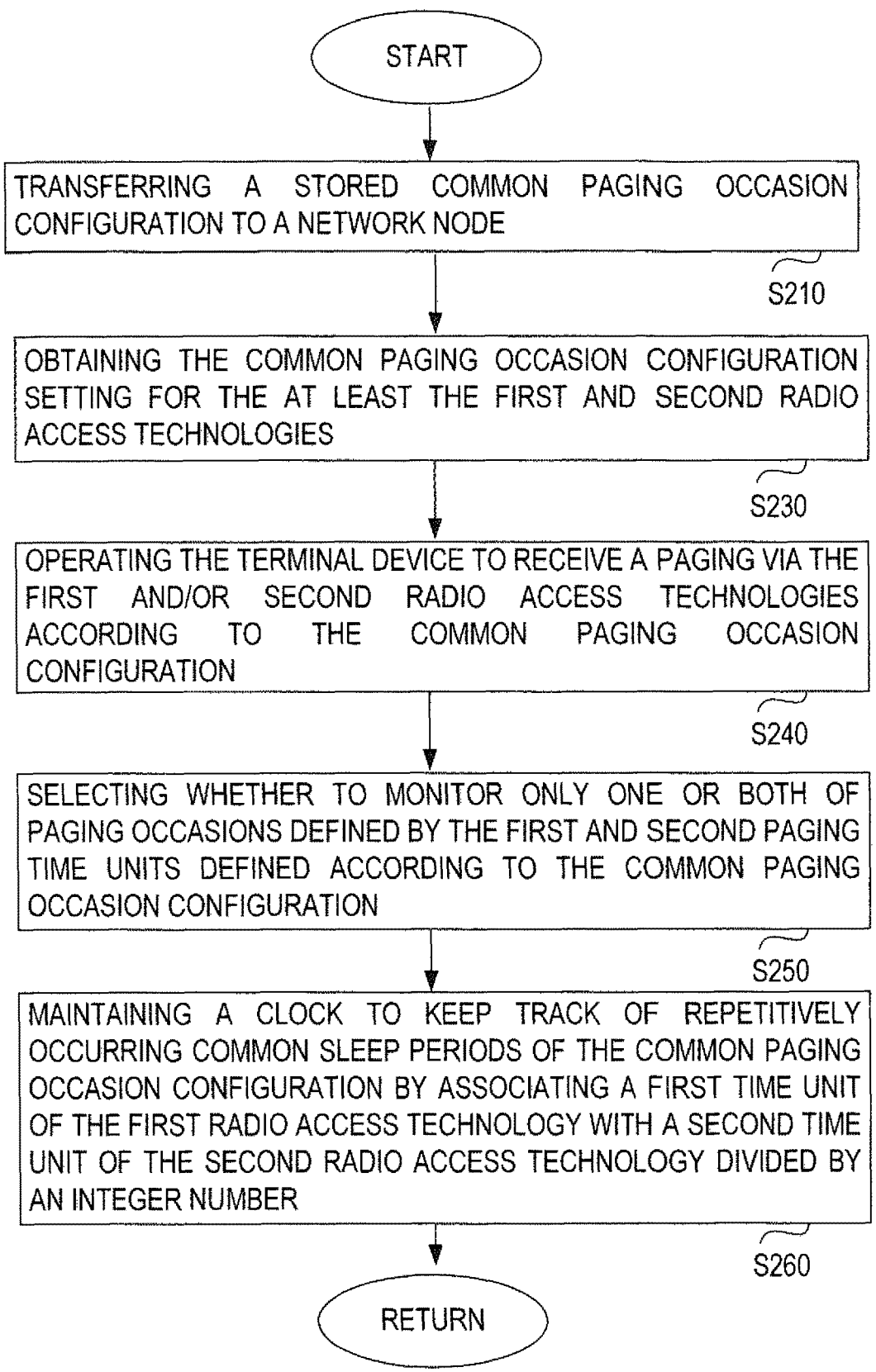
FIG. 9 is a schematic flow diagram illustrating another embodiment of a method for paging coordination between two different RATs in a terminal device.

FIG. 9 illustrates another embodiment of a paging method in a terminal device that is accessible via at least the first and second RAT which, in addition to the steps S230 and S240 as explained above, also includes the steps S210, S250, and S260.

According to step S210 of FIG. 9, the terminal device 10 transfers a common paging occasion configuration, as stored in a memory of the terminal device 10, to a network node 50, for example for the purpose of negotiating the common paging occasion configuration with the network node 50 (as explained above). Here, the transfer may, for example, be performed in conjunction with a attach procedure (attach request message) or a tracking area update procedure (tracking area update procedure message). It is noted that this may be related to any kind of such areas, e.g. areas typically used for the terminal device 10 in a core network controlled low-power state (e.g. idle state) (e.g. tracking areas, location areas, routing area) and areas used for the terminal device 10 in a RAN controlled low-power state (e.g. dormant state) (e.g. tracking RAN areas).

According to step S250 of FIG. 9, the terminal device 10 may further select whether to monitor only one or both of paging occasions defined by the first and second paging time units defined according to the common paging occasion configuration. In other words, even if both paging occasions are present and set within the common paging occasion configuration, the terminal device 10 may choose to, for instance, only monitor the paging occasion in the first RAT if it is satisfied with the quality of the reception. In this way, the most beneficial RAT may be selected by the terminal device, and the power consumption may be further reduced.

According to step S260 of FIG. 9, the terminal device 10 may be further operated to maintain an internal clock to keep track of repetitively occurring common sleep periods of the common paging occasion configuration by associating a first time unit of the first radio access technology with a second time unit of the second radio access technology divided by an integer number, as explained above with regard to condition (1). This may be particularly relevant for very long DRX sleep times (for example, relevant for extremely energy efficient MTC terminal devices, which may imply large differences in paging occasions between cells and implying potentially large "phase shifts" in the DRX paging cycle at cell reselection. Based on the above, the (MTC) terminal device 10 may, in due time, notice a cell change and retrieve paging occasion information in the new cell. "In due time" is a trade-off between energy efficiency (implying infrequent checking of cell) and the desire to avoid missing a paging occasion (implying frequent cell checking).

Figure 10:
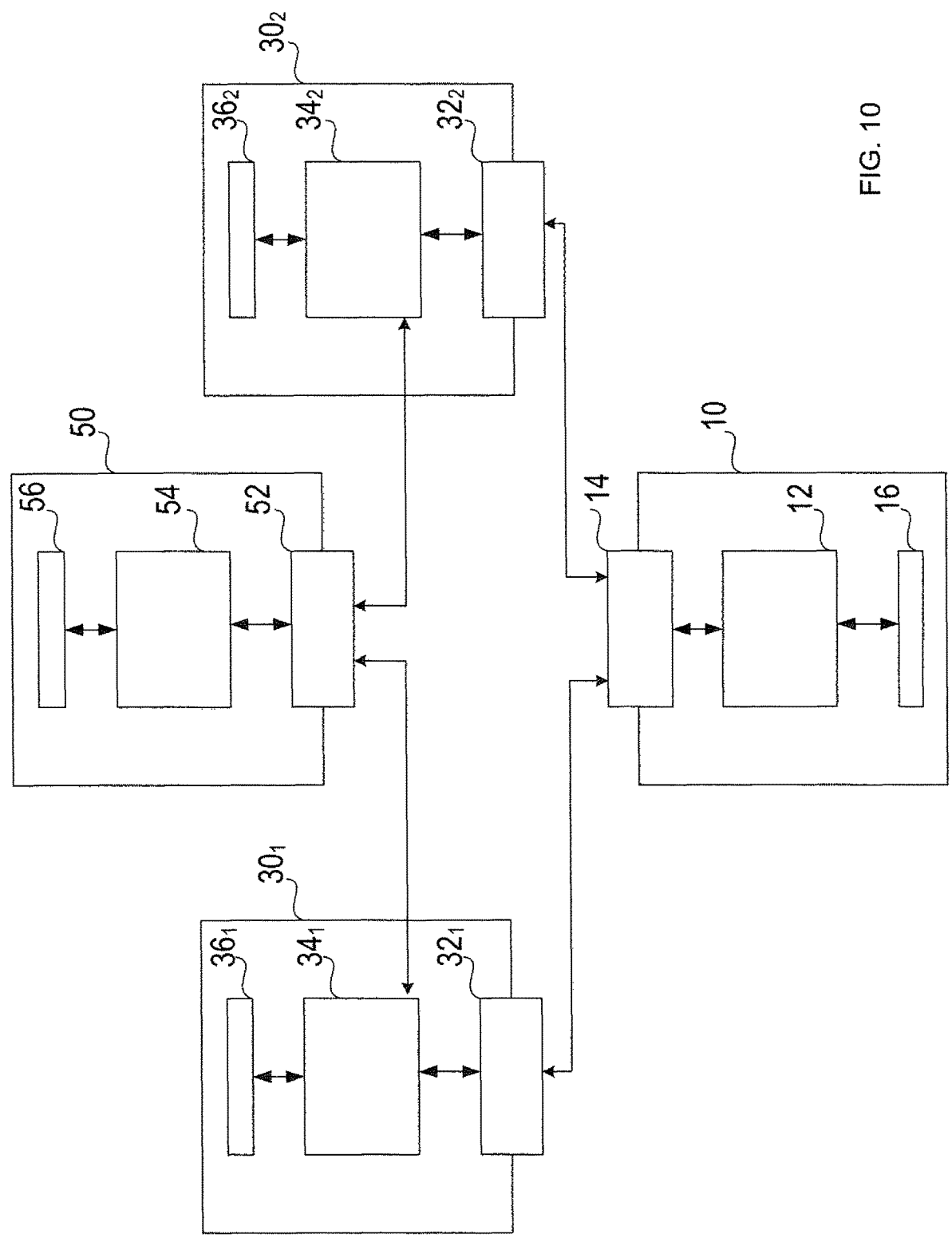
FIG. 10 is a schematic diagram illustrating a terminal device and a network node interacting via radio access network nodes for paging coordination between two different RATs according to an embodiment.

FIG. 10 schematically illustrates a terminal device 10 being accessible via a first radio access network node $30_1$ and a second radio access network node $30_2$ to a respective first and second type of wireless radio accesses operating with different radio access technologies. The radio access network nodes $30_1$, $30_2$ are further illustrated to have a communication connection (wireline or wireless) with another network node 50 which may be a core network node (such as a MME) or another network node, for example operating as an anchor node in the context of RAN internal paging as will be further explained below.

The terminal device 10 is provided with a radio transceiver module 14 that provides an air interface to the corresponding radio transceiver modules $32_1$ and $32_2$ of the respective radio access network nodes (eNBs) $30_1$, $30_2$. The radio transceiver modules 12 and 34 may respectively include transmitter circuits, receiver circuits, and associated control circuits that are collectively configured to transmit and receive signals and messages according to a respective different radio access technologies. The network node 50 is provided with a transceiver module 52 that provides the communication connection (wireline or wireless) with the radio access network nodes (eNBs) $30_1$, $30_2$.

As further illustrated in FIG. 10 the terminal device 10, the radio access network nodes $30_1$, $30_2$, and the (core or anchor) network node 50 further comprise a processing module 12, $34_1$, $34_2$, 54, respectively, that are configured to control the radio transceiver module 14, the radio transceiver modules $32_1$ and $32_2$, and the transceiver module 52 respectively. Each of the processing modules 12, $34_1$, $34_2$, 54 comprises one or more processors, e.g. one or more microprocessors, microcontrollers, multi-core processors, or the like. More generally, the processing module(s) may comprise fixed circuitry or programmable circuitry that is specifically configured via the execution of program instructions implementing the functionality taught therein, or may comprise combinations of fixed and programmable circuitry. Each of the processing modules also include and are connected to a respective memory module 16, $36_1$, $36_2$, and 56 respectively. The memory module(s), in some embodiments, store one or more computer programs and, optionally, configuration data. The memory module provides non-transitory storage for the computer program and it may comprise one or more types of computer-readable media, such as disk storage, solid-state memory storage, or any combination thereof. By way of non-limiting example, the memory module may comprise any one or more of SRAM, DRAM, EEPROM, and FLASH memory, which may be in the processing module 12, $34_1$, $34_2$, and 54 respectively and/or separate from the processing module. In general, the memory module comprises one or more types of computer-readable storage media providing non-transitory storage of the computer program and any configuration data used by the terminal device/network node. Here, "non-transitory" means permanent, semi-permanent, or at least temporarily persistent storage and encompasses both long-term storage in non-volatile memory and storage in working memory, e.g., for program execution.

In one further embodiment, the CN node or another network node (anchor node) 50 and the terminal device (UE) 10 handle the paging coordination (common paging occasion configuration) while the respective RAN nodes (eNBs) $30_1$, $30_2$ remain transparent and merely follow instructions from the CN. According to this embodiment, the common paging occasion configuration and the common paging occasions are set in an (negotiated) agreement between the CN and the UE.

According to a preferred embodiment thereof the UE 10 is configured with a common paging DRX period (common paging occasion configuration) for the different RATs (RAT-1 and RAT-2), i.e. the interval between paging occasions, which is expressed in time units, e.g. milliseconds, microseconds or number of time slots in the radio interfaces. Keeping track of the common paging DRX period may be facilitated in case the second RAT (NX/NR) radio interface has a time structure that is based on time units, e.g. time slots, which equals a corresponding time unit in the first RAT (LTE) radio interface divided by an integer, e.g. $TTI_{LTE}=k \times TTI_{NX}$ where k is an integer. With a support of this UE associated RAT-common paging DRX period the network is more flexible in its paging occasion allocation.

The configuration and setting of the common paging DRX period in the UE 10 may be performed in various ways. The common paging occasion configuration may, for example, be stored in the USIM card and transferred to the network (CN) node 50 in conjunction with the Attach procedure, e.g. in the Attach Request message (as the UE specific DRX period is in today's EPS/LTE), or in conjunction with a Tracking Area Update procedure, e.g. in the Tracking Area Update Request message. Another way of configuring the UE 10 with the common paging occasion configuration may be based on a mechanism in which the CN selects a common DRX period for the UE, e.g. based on at least one of UE capabilities, a UE category, previously acquired analytics of UE traffic behavior or subscription data received from the Home Subscriber Server (HSS) or based solely on internally configured operator preferences, and transfers the common DRX period to the UE in conjunction with the Attach procedure and/or the Tracking Area Update procedure, e.g. in the Tracking Area Update Accept message. Yet another possibility is that the common paging occasion configuration is based on a negotiation between the CN and the UE performed during the Attach procedure and/or the Tracking Area Update procedure. Here, the UE may propose a common DRX period, e.g. based on information in the USIM card, hardcoded data, current battery/energy status, recent activity (e.g. internally recorded statistics) and/or preferences configured by the user. The network (CN) node 50 could take the proposal from the UE into consideration and together with its own data and criteria (such as network load, operator policies for distribution of paging occasions between different UEs, and the like) derive a suitable common DRX period (which may be a compromise between the one proposed by the UE and one derived from CN algorithms/data) which is then transferred to the UE.

Here, the configuration of the common paging DRX period in the UE 10 may also take into account that different UEs have different qualities of the internal clock in terms of stability.

This may be a property that impacts the UE's common DRX period preference and may also impact the CN's choice of the common DRX period (provided that information about the UE's clock stability is conveyed to or available at the CN, e.g. in the shape of UE capability or category information. Furthermore, the UE may adapt its common DRX behavior based on the stability of its internal clock. For instance, the UE may determine the maximum clock drift during the common DRX sleep period and thus performs a control to wake up in advance with a corresponding margin. Another way to deal with a clock which may drift too much may be based on a periodical wake up to re-synchronize the UE clock, for example more or less independently of the common DRX period.

Based on the above embodiment the network (CN) node 50 may thus keep track of the common DRX period and the common paging occasions. When a UE 10 is to be paged and a common paging occasion is approaching, the network (CN) node 50 contacts the involved RAN nodes $30_1$, $30_2$, i.e. the RAN nodes responsible for the radio coverage of the UE's paging area, such as an RAT-1 eNB and a RAT-2 RAN node handling the paging, and requests them to send/forward a paging message to the UE. It is noted that also a single RAN node may be provided that simultaneously provides the two different RATs. The CN may contact the involved RAN nodes more or less simultaneously at the common paging occasion or preferably slightly before the common paging occasion. The CN may then indicate an exact time, for example by using a time reference that is common to the CN and the RAN node of the different RATs, when the RAN node should transmit the paging message to the UE. Alternatively, to allow some more flexibility for the RAN node to schedule the transmissions, the CN may give the RAN nodes a time window in which the paging message should be transmitted. This time window (size) may then be included in the common DRX/paging occasion configuration in the UE. A compromise may be that the RAN nodes attempt to page the UE exactly on the requested time, but if a RAN node has some restrictions regarding which slots it can use for paging and the requested paging time coincides with such restricted time slot, then the RAN node pages the UE in the first time slot available for paging following the requested paging time.

If the UE 10 is able to receive in both the different RATs simultaneously (dual radio UE), the paging occasions of the common paging occasion configuration should preferably/ideally be simultaneous in the two RATs. In practice it may be the case that this is at least not always possible, e.g. because time slots may be dedicated to other tasks, but then the paging occasions in the two RATs should at least occur as close to each other as possible, i.e. with a minimum time difference. If the UE, on the other hand, cannot receive in the two different RATs simultaneously, but only one at a time, then the paging occasions of the common paging occasion configuration in the two RATs should preferably be spaced apart with a guard time interval which provides sufficient time for the UE to switch between the RATs, but no more than necessary so that the UE may still receive/monitor the paging occasions in both RATs during the same wake period. In other words, the time between the paging occasions within the common wake period of the common paging occasion configuration across the two (different) RATs should (ideally) be no more than what the UE needs to switch between the RATs. The selection between simultaneous and sequential (minimal-delay) paging occasions in the two RATs can be based on UE capabilities, which, e.g., could be retrieved from the UE in conjunction with the Attach procedure and then stored in the core network (like in today's EPS/LTE). When sequential (minimal-delay) paging occasions are selected, then also the length of the spacing (i.e. the guard signal) between the paging occasions could be based on UE capabilities, for example based on the fact that different UEs need a different amount of time to switch between the different RATs.

Using the exact paging time instruction mechanism, as illustrated above, has the advantage that it provides the highest energy saving potential for the UE 10 since its common wake time can be shortened the most. The UE 10 may still have to wake up (switch into higher power mode) in advance due to a drifting clock, and potentially also to acquire synchronization, but it may still go back to sleep mode earlier than with the time window approach. A disadvantage with the exact paging time instruction is that it is inflexible for the respective RAN node(s) and restricts its possibilities to schedule transmissions based on other criteria. Note, however, that in principle this would be feasible even with today's LTE radio interface, since a page message is like any other message on the PDSCH, the only difference being that the scheduling assignment is addressed to the P-RNTI instead of a C-RNTI (or some other RNTI).

The time window instruction approach has the advantage that it allows more flexibility for the respective RAN node's scheduling and the disadvantage is that the UE has to stay awake somewhat longer in order to monitor a paging occasion in the common paging occasion configuration.

Figure 11:
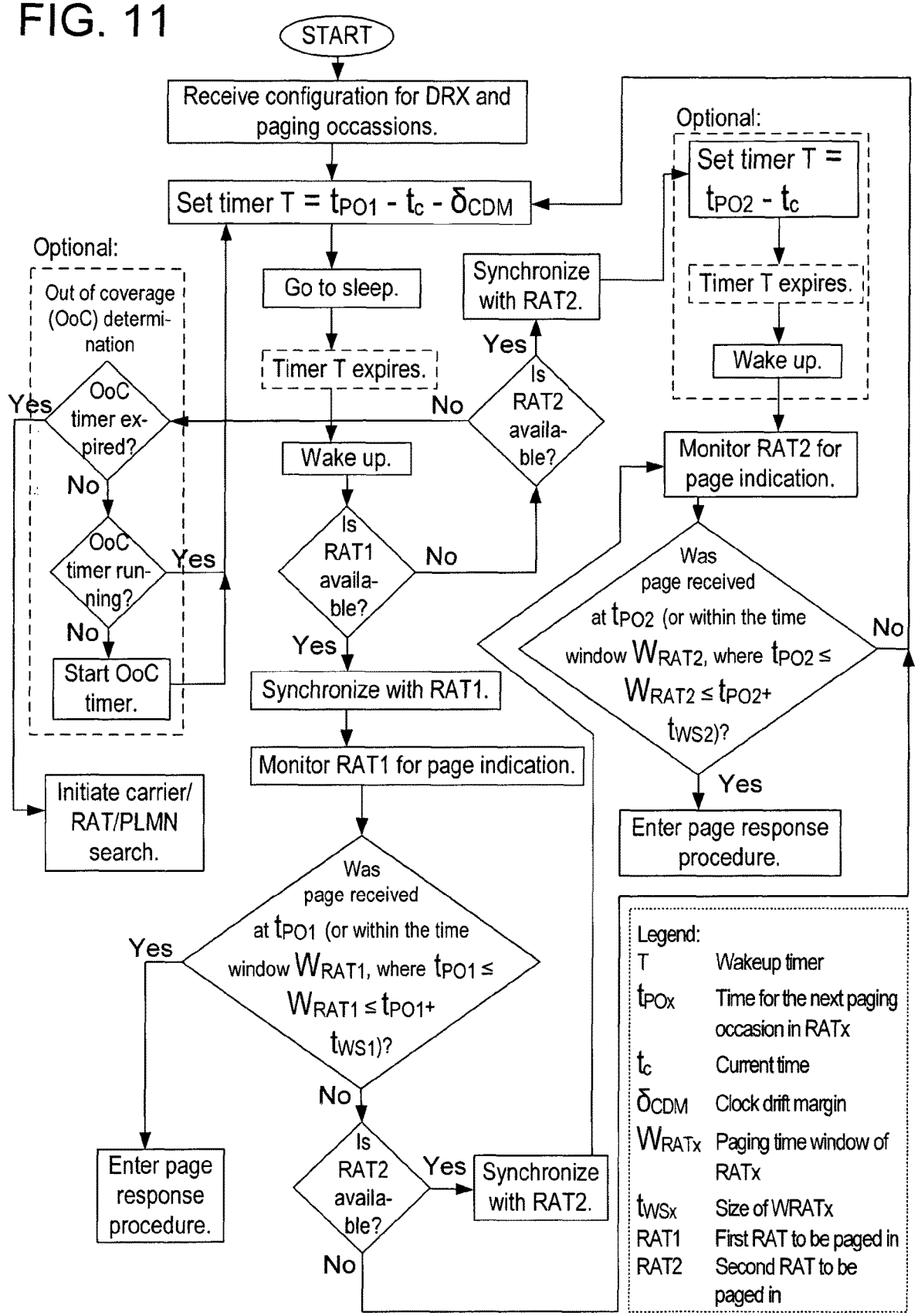
FIG. 11 schematically illustrates a flow diagram of processes in a terminal device according to another embodiment.

FIG. 11 schematically illustrates a flow diagram of processes in a terminal device 10 according to another embodiment. According to this embodiment, the terminal device 10 is able to monitor only one RAT at a time when above case of using an exact paging time indication (or a paging window) is used (see step S140 in FIG. 6). It is noted that the potential need for a Tracking Area Update (or corresponding procedure) is disregarded here, i.e. the flow chart assumes that the UE 10 remains within the area(s) where the communication network will page it, if needed. It is also noted that the out of coverage determination procedure is just a possible example and it is not to be regarded as a part of the invention.

An alternative embodiment to using an exact paging occasion time or time window indication from the CN would be to reuse the legacy algorithm for derivation of paging occasions in LTE and the CN instructs the eNB to page the UE in the first paging occasion as derived using the legacy algorithm and the cell specific configuration parameters. In this case, a similar algorithm may be also used for NX/NR too or the principle of exact time or time window may be used in the CN's paging request to an NX/NR RAN node. Here, reusing the legacy paging occasion algorithm means that it has less impact on existing LTE networks and specifications, but a significant disadvantage is that the UE has to acquire the system information in order to derive the paging occasions, e.g. in a certain LTE cell (or alternatively has to monitor the PDCCH for the P-RNTI during a time window long enough to cover the longest time until the first paging occasion that the legacy algorithm could produce (depending on the cell specific parameters)).

Another alternative embodiment in which the respective RAN nodes remain "transparent" is to utilize timestamps of a universal time, such as GMT, to define the paging occasions. To support the scheme and facilitate the timekeeping in the UE the network should preferably transmit/broadcast time indications with regular intervals. This provides a simple and consistent time reference across RATs and cells/RAN nodes.

The following embodiment describes additional details of aspects that relate to the synchronization if radio frame numbers across the first and second RAT, as described above with regard to step S150 according to FIG. 6. In particular, the following embodiment(s) are based on a synchronization between RATs, cells, or network parts in terms of radio frame numbers and time.

In this embodiment, the proposed solutions are based on a radio frame numbering synchronization throughout the communication network. This simplifies the usage of a radio frame number based the common paging occasion configuration, since the UE 10 may assume a consistent frame numbering throughout the registration/paging area and does not have to take into account that the phase of the frame number cycle can shift arbitrarily when the UE moves between cells or radio access nodes.

The synchronization of the frame numbering in LTE (first RAT) and NX/NR (second RAT) may require a kind of numerology where the length of an LTE frame is an integer multiple of the length of an NX/NR frame, i.e. $frame_{LTE}=k \ frame_{NX}$ and $TTI_{LTE}=k \times TTI_{NX}$ where k is an integer, as described above.

With the kind of frame based paging occasion algorithm that is used in LTE today the same paging occasion pattern is repeated in every frame cycle (where a frame cycle is the number of frames until the frame number wraps around). This makes the relation between the frame cycles of LTE and NX/NR respectively a significant aspect in this context.

Figure 12A:
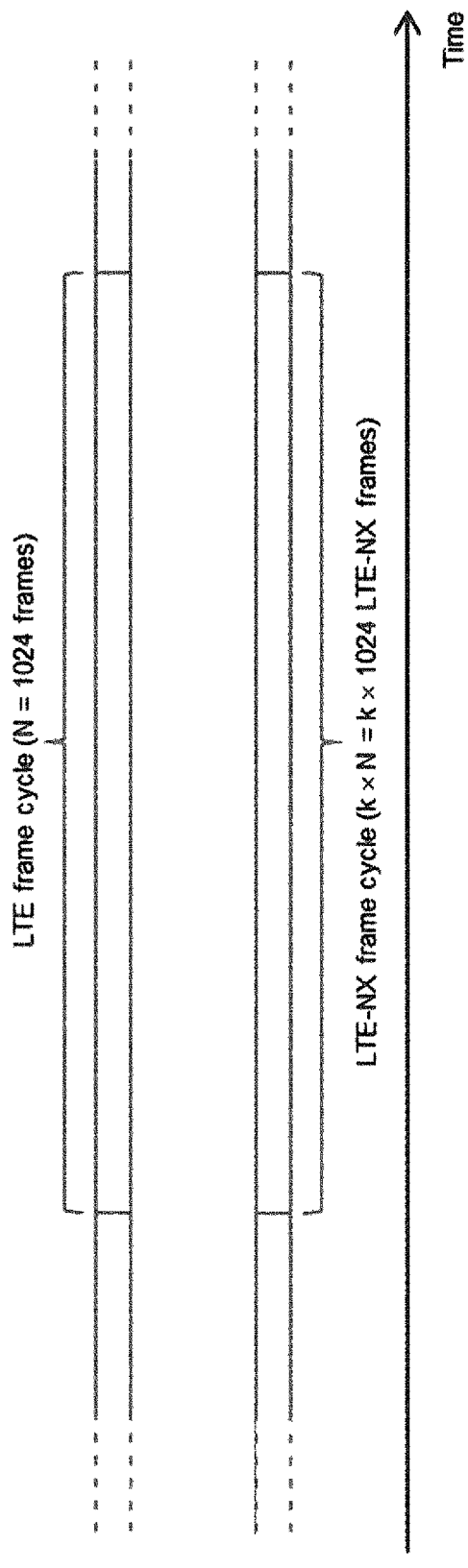
FIG. 12A schematically illustrates a scenario where a 5G (NX/NR) frame cycle has the same time length as an LTE frame cycle, but k times as many frames.
Figure 12B:
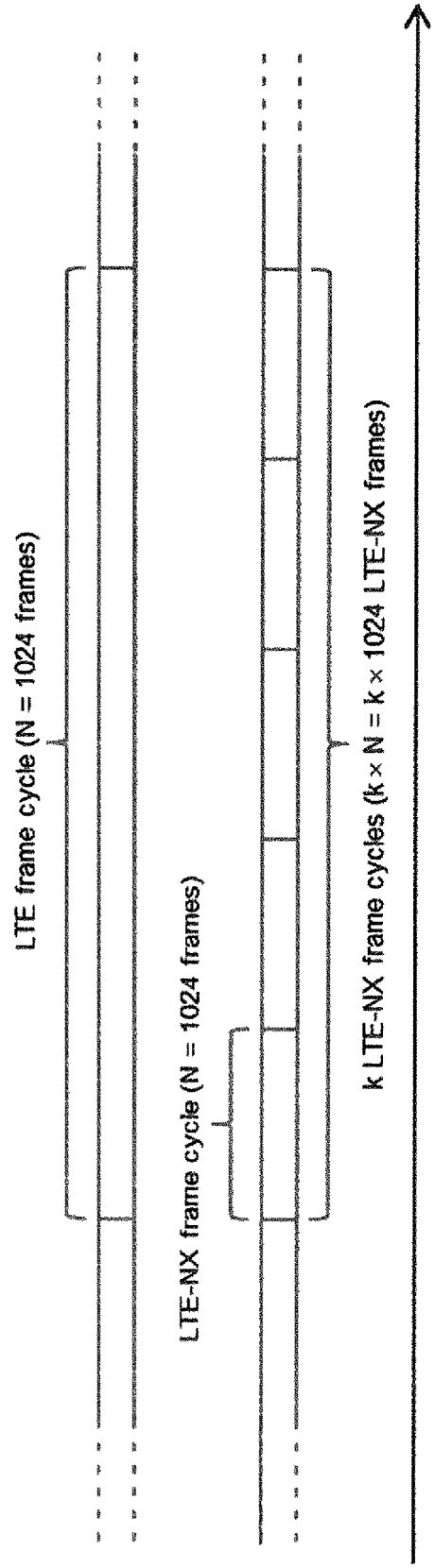
FIG. 12B schematically illustrates where a 5G (NX/NR) frame cycle contains equally many frames as an LTE frame cycle.

Two approaches may be used here. First, the time period of an NX/NR frame cycle may be equal to the time period of an LTE frame cycle. This would mean that an NX/NR frame cycle will include k times as many frames. This frame cycle relation is illustrated in FIG. 12A. Second, an NX/NR frame cycle may contain the same number of frames as an LTE frame cycle. This would mean that an LTE frame cycle would be k times as long in time as an NX/NR frame cycle, i.e. the NX/NR frame number would wrap around k times while the LTE frame number wraps around once. This frame cycle relation is illustrated in FIG. 12B.

Even when the paging occasions are intended to coincide in LTE and NX/NR, it is preferable to have one paging occasion algorithm for each RAT and, furthermore, that these paging occasion algorithms produce the same result, i.e. coinciding paging occasions according to the common paging occasion configuration. This is particularly helpful for a UE 10 which only monitors one of the RATs at a time, even though it (at least from the network's point of view) is camping on both RATs and may be paged in both RATs, so that it can calculate the correct paging occasions irrespective of which RAT it monitors.

With the equal time length frame cycle principle the NX/NR frame number can easily be translated into the corresponding LTE frame number through integer division by the numerology multiple (i.e. integer division by k). The same algorithm to point out the paging frames within the frame cycle could thus be used in both RATs, the only difference being that the frame number of NX/NR would be subjected to integer division by k before it is fed into the algorithm. This allows keeping the principle of repeating the same paging occasion pattern in each frame cycle in both LTE and NX/NR, as illustrated in example A) in FIG. 13. The determination/computation of the radio subframe(s) (or a corresponding notion, e.g. TTI) of the paging occasion(s) within the paging frame would however require a different algorithm, because of the shorter TTI of NX/NR and because the paging frame of LTE would map to k frames in NX/NR. Each TTI (subframe) of LTE would correspond to k TTIs in NX/NR. A straightforward principle would be to state that the paging occasion in NX/NR that corresponds to the paging occasion in a certain subframe of LTE will be located in the NX/NR TTI starting simultaneously with the concerned subframe of LTE (i.e. the first of the k NX/NR TTIs that map to the same LTE subframe). Equally straightforward would be to choose any of the other k NX/NR TTIs that map to the same LTE subframe, as long as it is fixed which TTI it is. If the integer multiple k is chosen strategically, a rather simple translation from the subframe within the paging frame of LTE to the corresponding frame and TTI of NX/NR could be designed, but for the general case it would be easier to base the TTI calculation algorithm of NX/NR solely on the number of NX/NR TTIs since the start of the LTE paging frame, e.g. a paging occasion in the third subframe in the LTE paging frame (i.e. subframe 2 with the subframes being numbered from 0 through 9) would map to an NX/NR TTI located k×2+1 NX/NR TTIs from the start of the LTE paging frame (if the principle of using the NX/NR TTI mapping to the start of a an LTE subframe is used).

With the equal number of frames per frame cycle principle there is no unambiguous way of translating an NX/NR frame number to an LTE frame number. In addition, if the same paging occasion pattern is to be repeated in every NX/NR frame cycle, a consequence is that the paging frames of an LTE frame cycle must be equally spaced and their number must be a multiple of the numerology multiple k (e.g. q×k, where both q and k are integers). This is illustrated in example B) in FIG. 13.

Figure 13:
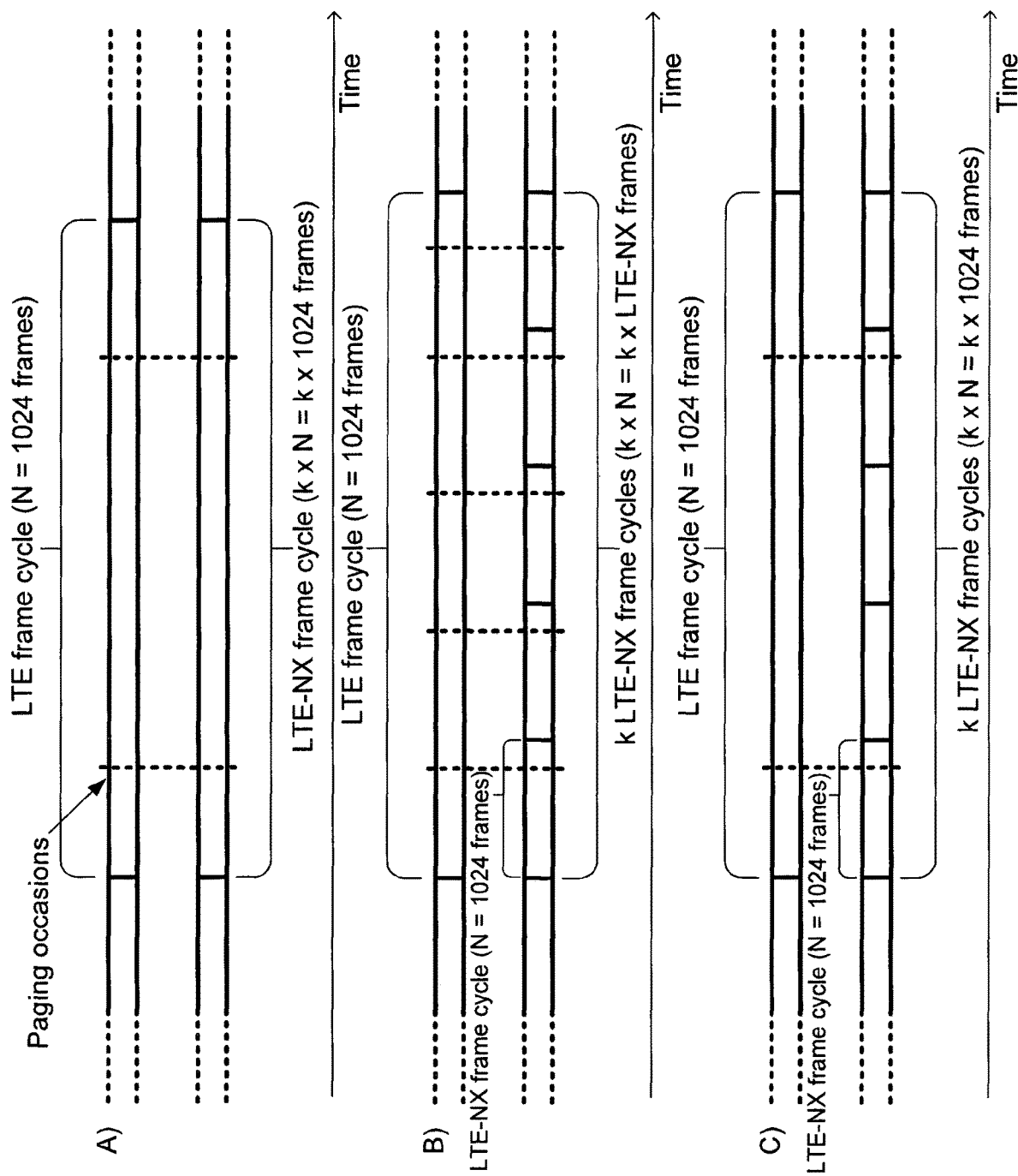
FIG. 13 schematically illustrates paging occasions with different relations between the frame cycles of LTE and the 5G radio access technology (NX/NR).

If these restrictions are to be avoided, then the principle of repeating the same paging occasion pattern in each NX/NR frame cycle would have to be abandoned and the paging occasion algorithm would thus have to have a scope spanning multiple NX/NR frame cycles. Example C) in FIG. 13 illustrates a case where the paging algorithm for NX/NR would have to produce a result equivalent to:

"The paging occasions are located as follows: frame X and TTI Y in the current frame cycle, then the next paging occasion is located in frame Q and TTI P three frame cycles ahead and the next paging occasion after that is located in frame Z and TTI R an additional two frame cycles ahead, etc."

Obviously, this algorithm would be simplified if the paging occasions are chosen to form a repetitive pattern also in LTE-NX/NR, even if not all LTE-NX/NR frame cycles contain paging occasions.

The following embodiment describes additional details of aspects that relate to case in which there is no synchronization of radio frame numbers across the first and second RAT, and therefore requires an indicating of radio frame number differences in the context of the applying the common paging occasion configuration, as described in step S160 according to FIG. 7. In particular, the following embodiment(s) describe the case of no synchronization of radio frame numbers across the first and second RAT, but in which the terminal device 10 is informed about radio frame number differences.

In this case the embodiments "accept" that radio frame numbers are not synchronized between cells, radio access nodes and/or RATs, but introduce various levels of support for the terminal device 10 to deal with this situation. Also here (like in the synchronization case above) it is assumed that frame number based paging occasion algorithm(s) is (are) used.

To this end, the terminal device 10 may be informed about the frame number differences between cells, radio access nodes and RATs. Here, the RAN nodes $30_1$, $30_2$ may learn about these differences through a periodic exchange of frame numbering between neighboring RAN nodes. A RAN node $30_1$, $30_2$ would also inform its neighbor RAN nodes if any of the cell specific (or corresponding for NX/NR such as radio access node specific) paging occasion related parameters are changed. The information about frame numbering and cell specific (or corresponding for NX/NR such as radio access node specific) paging occasion related parameters may also be further propagated by neighboring RAN nodes to non-neighboring RAN nodes and arbitrary number of hops.

This information may be available in the system information broadcasted in the network. The frame number difference information may also include both intra-RAT and inter-RAT neighbor cells and/or radio access nodes in a certain vicinity, wherein this vicinity may comprise, e.g, (i) neighbor cells and/or neighbor radio access nodes, (ii) neighbor and next neighbor cells and/or neighbor and next neighbor radio access nodes, or (iii) cells and/or radio access nodes within a certain area related to the UE's registration area, e.g. all cells and/or radio access nodes which support (are part of) a the same tracking area.

Furthermore, the frame number difference information may be complemented by information about the cell specific (or corresponding for NX/NR such as radio access node specific) parameters related to calculation of paging occasions in the concerned cells and/or radio access nodes. Alternatively, these cell specific (or corresponding for NX/NR such as radio access node specific) parameters may be configured to be the same, e.g., in certain tracking areas or groups of tracking areas or even in the entire network or for certain types of cells and/or radio access nodes within a certain area which could comprise the entire network.

With this information at hand the UE 10 only has to retrieve the identity of the cell and/or radio access node to calculate the paging occasions, i.e. it is relieved from acquiring the frame numbering and paging occasion related information from the system information. The UE 10 may even have an even more relaxed operation, choosing not to even acquire the identity of the cell/radio access node, but simply monitor all paging occasions that could occur in the area where it is moving around. Realistically the UE 10 would only use such a strategy in small areas (or during relatively short time periods) so that the number (or frequency) of paging occasions does not force too frequent wake-ups from the DRX sleep mode. A suitable scenario for this strategy may be a case where the frame numbers are locally synchronized, e.g. in all cells served by the same radio access node or a group of radio access nodes, in which case a UE may sometimes (without checking cell/radio access node identities) be relatively sure that it still remains in the area where the frame numbers are synchronized and provided that also the cell specific (or corresponding for NX/NR such as radio access node specific) paging occasion related parameters are the same (at least per RAT) for the cells/radio access nodes within this area, the UE only has to monitor one set of paging occasions (i.e. no additional ones due to differences in cells/radio access nodes).

Alternative or complementing ways for the RAN node $30_1$, $30_2$ to provide information about frame number differences and/or differences in cell specific (or corresponding for NX/NR such as radio access node specific) paging occasion related parameters include that the information could be sent to a UE 10 in connected state (e.g. in RRC_CONNECTED state with an RRC connection established), e.g. using a message like the RRCConnectionReconfiguration message and/or the RRCConnectionRelease message.

The information about frame number differences and/or differences in cell specific (or corresponding for NX/NR such as radio access node specific) paging occasion related parameters may also be provided to the UE 10 by the core network node 50, e.g. in conjunction with a location update, e.g. in the Tracking Area Update Accept message in conjunction with a tracking area update procedure. This would ensure that the UE 10 has this information for all the cells/radio access nodes in its registration area. A prerequisite for this to be possible is that the core network node 50 can acquire this information from the radio access nodes $30_1$, $30_2$. This could e.g. occur in conjunction with deployment (or restarts) of each radio access node and the radio access node could update the core network node 50 periodically to keep the information fresh enough. That the core network node 50 can actively request the information from a radio access node is also an option.

The support to the UE 10 to alleviate the consequences of unsynchronized radio frame numbering across the RATs could be further extended with a mechanism to adapt the paging occasions to fully or partly compensate for the frame number differences (and possible differences in cell specific (or corresponding for NX/NR such as radio access node specific) paging occasion related parameters). This would effectively result in that the paging occasions are consistent in all cells the UE may visit.

The proposed approach to achieve this is that the core network node 50 informs the RAN node $30_1$, $30_2$ of the frame numbering (and possible cell specific (or corresponding for NX/NR such as radio access node specific) paging occasion related parameters) in the paging command (e.g. in the S1AP Paging message in EPS/LTE). To avoid the need for the core network to actually know this information, the proposed method is that the core network in the paging command indicates a reference cell or radio access node, whose frame numbering (and possibly cell specific (or corresponding for NX/NR such as radio access node specific) paging occasion related parameters) is to be applied. Together with the knowledge of differences in frame numbers (and possibly cell specific (or corresponding for NX/NR such as radio access node specific) paging occasion related parameters) that each radio access node has about the cells and radio access nodes in its vicinity (as described above) the radio access node can calculate the paging occasions to use for the concerned paging (provided that the reference cell/radio access node is located within this vicinity). The reference cell/radio access node is preferably the last one via which the UE was in contact with the network. Alternatively, the reference cell/radio access node may be the one via which the UE performed its latest location update (e.g. tracking area update in EPS/LTE). The core network inherently knows which radio access node this is (from the interface/connection with the radio access node) and may also be informed of which cell (if relevant) the UE is located in during the contact (which is already the case in EPS/LTE).

If the core network node 50 is aware of the actual differences in the frame numbering (and possibly cell specific (or corresponding for NX/NR such as radio access node specific) paging occasion related parameters), which is described as one option above, an alternative to the use of a reference cell/radio access node could be that the core network indicates these differences in the paging command to the radio access node.

The information about frame numbering differences may be further refined by a more accurate information at the level of fractions of a frame, e.g. subframes (or even less) in LTE. To achieve this higher accuracy in the information distributed among the RAN nodes, the RAN nodes may leverage the Automatic Neighbor Relation (ANR) mechanism, i.e. the mechanism by which connected UEs are utilized to discover neighbor relations between cells or radio access nodes. A UE 10 would thus on request read the frame number of a neighbor cell/radio access node and could then compare the frame number as well as the phase of the frame number (e.g. in terms of subframe) and possibly even subframe phase with the corresponding data for the requesting cell/radio access node and report the frame number of the neighbor cell/radio access node and the detected phase difference(s).

The scheme where the UE 10 is informed of differences in frame numbering (and possibly cell specific (or corresponding for NX/NR such as radio access node specific) paging occasion related parameters) between cells/radio access nodes (without the extended support where the radio access nodes are instructed to compensate for these differences during pages) is easier to realize in limited areas, partly because it simplifies the distribution of the information among the radio access nodes and partly because it limits the amount of information that is conveyed to the UE 10. In a minimalistic embodiment, it is limited to a relatively small area, such as a radio access node $30_1$ and its neighbor radio access nodes $30_2$ and possibly one more "tier" of neighbor radio access nodes (or a cell, its neighbor cells and possibly second neighbor cells) and is utilized only to facilitate for the UE 10 to deal with the paging occasion differences between cells/radio access nodes, so that it only has to monitor a few different paging occasions in order to cover all possible paging occasions in the limited area.

The following embodiments further define aspects of UE states in (tight) integration scenarios between LTE and NX/NR. In LTE, initiating data transmission from RRC_IDLE state in LTE involves significantly more signaling (and consequently delays) than data transmission from RRC_CONNECTED state with DRX (LTE-A requires the DRX transition in RRC_CONNECTED state to be lower than 10 ms). On the other hand it might be challenging (and not efficient) to always keep all UEs in RRC_CONNECTED state, especially assuming that there will be billions of devices in 5G networks. Therefore, a dormant state is proposed that enhances the LTE RRC_CONNECTED with a DRX state to become the primary sleep state for the 5G architecture.

In addition to the dormant state (optimized for energy saving) there will be an active state used for actual data transmission. This state is optimized for data transmissions, but allows the UE 10 to micro-sleep, thanks to DRX configuration, when no data is transmitted, but a very quick access is desired.

Further, it is acknowledged that the new 5G air interface (or variants thereof) should be tightly integrated with LTE in order to benefit from the widely deployed coverage of LTE in the 2020 timeframe. Among the motivations for this tight integration one can mention the fact that the coverage of the new 5G air interface could be spotty, so that dual connectivity solutions with LTE would be very beneficial. It is noted that these scenarios also motivate a common CN connection (e.g. an evolved S1) for both accesses in the case of dual-radio UEs. Therefore, it makes sense for a UE in dormant state to keep context related to its evolved S1 connection.

Figure 14:
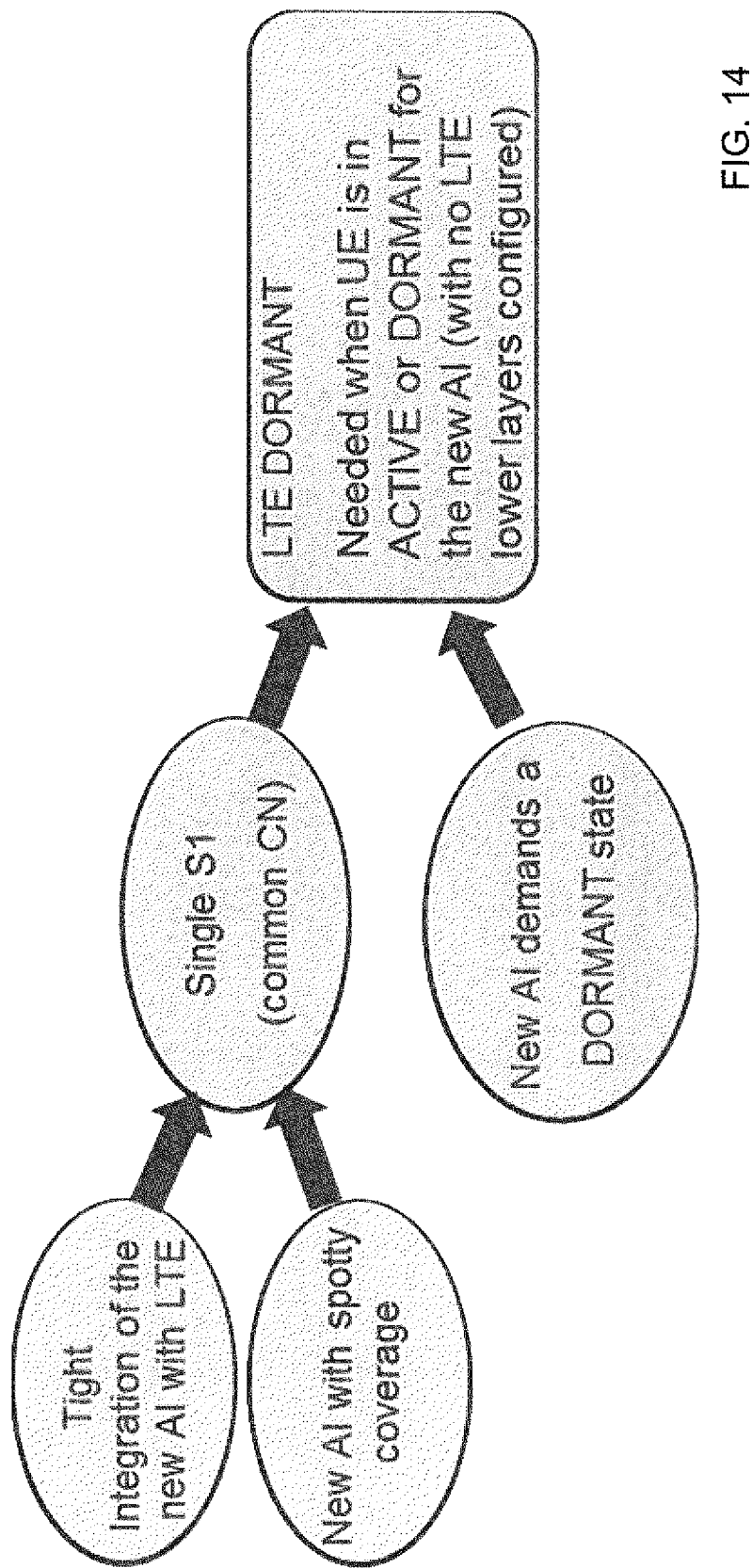
FIG. 14 schematically illustrates the impact of a new UE state on the tight integration of the 5G radio access technology (NX/NR) with LTE.

In order to support the tight integration with LTE for dual-radio UEs, the LTE radio should also be considered in the design of the dormant and active states. Otherwise, any toggling between the new air interface (AI) and LTE coverage due to bad coverage reasons would lead to signaling to update the LTE state. This is summarized in FIG. 14. In order to further address the tight integration of the new air interface and the evolution of LTE, a new state model is proposed for the 5G architecture enabling an efficient UE sleep mode, a fast and lightweight transition from sleeping to active states and joint access optimizations such as a fast establishment of dual connectivity. Here, the new dormant states, as shown in the white part of FIG. 15, will have the following characteristics:

Widely configurable DRX cycles (from milliseconds to hours to support different services with different requirements in terms of energy consumption and access delays).

Very fast and lightweight transition to and from this state (depending on the scenario, whether optimized for energy saving or fast access performance), enabled by storing and resuming the RAN context (RRC) in the UE and in the network.

Optimized state transitions in particular for the case where the UE is semi-static i.e. the UE remains in the same location after the inactivity timer expires.

Figure 15:
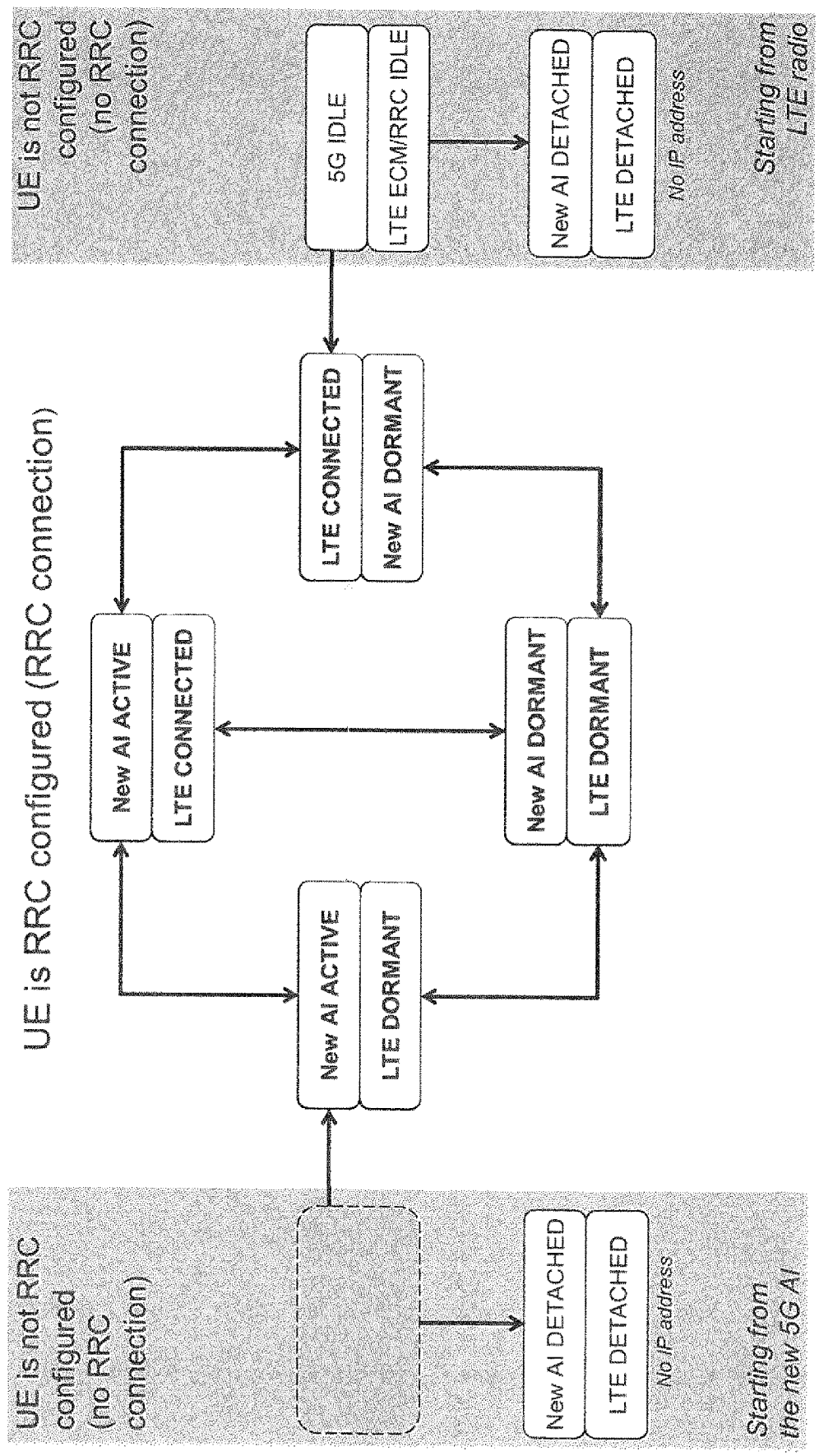
FIG. 15 schematically illustrates a state handling for the 5G architecture.

The embodiment according to FIG. 15 consists of four connected states where three of them are considered active states (i.e. optimized for transmission in at least one of the RATs) and one of them is optimized for UE sleeping (i.e. the dormant state) in both RATs.

The previous embodiments according to this invention propose a method to control the camping behavior of UEs in both RATs and how to monitor paging channels in these two RATs, where LTE and NX/NR are presented as the main examples. Considering the state diagram according to FIG. 15, the method described would be applied for UEs in new AI DORMANT/LTE DORMANT or 5G IDLE/LTE ECM+ RRC IDLE states, where the UE 10 is configured to perform actions towards both radio interfaces and prepared to access both or either RAT. In these states paging is the primary way the network contacts the UE 10, regardless of the RAT the UE will connect to.

As a further alternative embodiment to the legacy core network initiated paging that is being considered for 5G and EPS/LTE evolution is to introduce a state where the UE 10 is in principle regarded as being connected, whereas the UE is actually in a kind of dormant state handled by the RAN. Hence, there is a UE associated RAN-CN connection established, e.g. an S1 connection, and the RAN node responsible for this connection can be denoted the anchor node. The anchor node maintains a context related to the UE and this context may optionally also be fully or partially copied or distributed to other RAN nodes.

With this setup, paging would typically be triggered by downlink data arriving from the CN to the anchor node and the anchor node would initiate the paging by sending paging message(s) destined for the UE across the radio interface. The anchor node would also trigger other RAN nodes which are responsible for coverage of the area which the UE has been configured with for its dormant state operation. This could be done by sending page messages to the other RAN nodes which forward the page messages across the radio interface. Alternatively, the anchor node would merely instruct the other RAN nodes to page the UE in the relevant area. Intelligent, resource efficient paging schemes, where e.g. the paging area is covered step-wise one part at a time, e.g. by expanding the scope of paging, may also be applied.

The previously described embodiments may all be applied also in a communication network where this kind of RAN internal paging is employed. To adapt the solutions, the role of triggering the paging is simply moved from the CN to the anchor node in the RAN. Apart from that, the above described solutions can in principle be reused unchanged (except for the case, where the core network support is leveraged to adapt the paging occasions to fully or partly compensate for frame number differences (and possible differences in other relevant parameters)).

The above respective modules may be implemented by a processing unit that include one or a plurality of processors, a microprocessor or other processing logic that interprets and executes instructions stored in a main memory, i.e. memory modules 16, 36$_1$, 36$_2$, and 56. The main memory may include a RAM or other type of dynamic storage device that may store information and instructions for execution by the respective modules/units. For example, the radio transceiver modules 12, 32$_1$ and 32$_2$ and the corresponding processing module 12, 34$_1$ and 34$_2$ as well as the transceiver module 52 and the corresponding processing module 54 discussed above with respect to FIG. 10 may be realized by the processing unit/processor. The ROM may include a ROM device or another type of static storage device that may store static information and instructions for use by the processing unit.

As mentioned above, the radio access network nodes (base stations) 30$_1$ and 30$_2$ as well as the terminal device 10 and the (core or anchor) network node 50 may perform certain operations or processes (acquiring, identifying, transmitting, predicting, decision making, etc.) described herein. These operations may be performed in response to the processing unit/processor executing software instructions contained in a computer-readable medium, such as the main memory, ROM and/or storage device. A computer-readable medium may be defined as a physical or a logical memory device. For example, a logical memory device may include memories within a single physical memory device or distributed across multiple physical memory devices. Each of the main memory, ROM and storage device may include computer-readable media with instructions as program code. The software instructions may be read into the main memory for another computer-readable medium, such as a storage device or from another device via the communication interface.

Further, the software instructions contained in the main memory may cause the processing unit(s) including a data processor, when executed on the processing unit, to cause the data processor to perform operations or processes described herein.

Alternatively, hard-wired circuitry may be used in place or on in combination with the software instructions to implement processes and/or operations described herein. Thus, implementations described herein are not limited to any specific combination of hardware and software.

The physical entities according to the different embodiments of the invention, including the elements, units, modules, nodes and systems may comprise or store computer programs including software instructions such that, when the computer programs are executed on the physical entities, steps and operations according to the embodiments of the invention are carried out, i.e. cause data processing means to carry out the operations. In particular, embodiments of the invention also relate to computer programs for carrying out the operations/steps according to the embodiments of the invention, and to any computer-readable medium storing the computer programs for carrying out the above-mentioned methods.

Where the term module is used, no restrictions are made regarding how distributed these elements may be and regarding how gathered these elements may be. That is, the constituent elements/modules/units of the base stations $30_1$ and $30_2$ as well as the terminal device 10 and the network node 50 may be distributed in different software and hardware components or other devices for bringing about the intended function. A plurality of distinct elements/modules may also be gathered for providing the intended functionality. For example, the elements/modules/functions of the UE/nodes may be realized by a microprocessor and a memory similar to the above node including a bus, a processing unit, a main memory, ROM, etc. The microprocessor may be programmed such that the above-mentioned operations, which may be stored as instructions in the memory, are carried out.

Further, the elements/modules/units of the apparatus may be implemented in hardware, software, Field Programmable Gate Arrays (FPGAs), application-specific integrated circuits (ASICs), firmware or the like.

It will be apparent to those skilled in the art that various modifications and variations can be made in the entities and methods of this invention as well as in the construction of this invention without departing from the scope or spirit of the invention.

The invention has been described in relation to particular embodiments and examples which are intended in all aspects to be illustrative rather than restrictive. Those skilled in the art will appreciate that many different combinations of hardware, software and/or firmware will be suitable for practicing the present invention.

Moreover, other implementations of the invention will be apparent to those skilled in the art from consideration of the specification and practice of the invention disclosed herein. It is intended that the specification and the examples be considered as exemplary only, wherein abbreviations used in the above examples are listed below. To this end, it is to be understood that inventive aspects lie in less than all features of a single foregoing disclosed implementation or configuration. Thus, the true scope and spirit of the invention is indicated by the following claims.

The invention has been described in relation to particular embodiments and examples which are intended in all aspects to be illustrative rather than restrictive. Those skilled in the art will appreciate that many different combinations of hardware, software and/or firmware will be suitable for practicing the present invention.

ABBREVIATIONS

3GPP $3^{rd}$ Generation Partnership project
5G $5^{th}$ Generation
AI Air Interface
CA Carrier Aggregation
CC Component Carrier
CFI Control Format Indicator
CN Core Network
CR Change Request
CRS Cell specific Reference Signal
DC Dual Connectivity
DFT Discrete Fourier Transform
DL Downlink
DRX Discontinuous Reception
eNB Evolved NodeB
EPS Evolved Packet System
E-UTRAN Evolved Universal Terrestrial Radio Access Network
IMSI International Mobile Subscribe Identity
LTE Long Term Evolution
LTE-A LTE Advanced
MAC Medium Access Control
MCG Master Cell Group
MeNB Master eNB
MME Mobility Management Entity
MTC Machine Type Communication
NAS Non-Access Stratum
OFDM Orthogonal Frequency Division Multiplex
PCC Primary Component Carrier
PCell Primary Cell
PDCCH Physical Downlink Control Channel
PDCP Packet Data Convergence Protocol
PDSCH Physical Downlink Shared Channel
PRB Physical Resource Block
P-RNTI Paging RNTI
RAN Radio Access Network
RAT Radio Access Technology
RB Resource Block
RLC Radio Link Control
RNTI Radio Network Temporary Identifier
RRC Radio Resource Control
RX Reception/Receive
S1 The interface between the radio access network and the core network in EPS/LTE
S1AP S1 Application Protocol
SCC Secondary Component Carrier
SCell Secondary Cell
SCG Secondary Cell Group
SeNB Secondary eNB
S-GW Serving Gateway
SRB Signaling Radio Bearer
TS Technical Specification
TTI Transmission Time Interval
TX Transmission/Transmit
UL Uplink

The invention claimed is:
1. A method in a wireless communication network, the wireless communication network providing radio access for a terminal device via at least a first and second type of wireless radio accesses operating with different radio access technologies, wherein the method comprises:

setting a common paging occasion configuration for the at least first and second radio access technologies, wherein setting the common paging occasion configuration is based on a difference in radio frame length between the first and second radio access technologies; and paging the terminal device via the first and/or the second radio access technologies according to the common paging occasion configuration.

2. The method of claim 1, wherein the common paging occasion configuration defines a repetitively occurring common wake period of the terminal device for the at least first and second radio access technologies.

3. The method of claim 1, wherein the common paging occasion configuration defines a repetitively occurring common sleep period of the terminal device for the at least first and second radio access technologies.

4. The method of claim 1, wherein the common paging occasion configuration defines a first paging time unit for the first radio access technology and a second paging time unit for the first radio access technology.

5. The method of claim 4, wherein the first paging time unit and the second paging time unit are arranged such that the common wake period of the terminal device has a minimum duration.

6. The method of claim 5, wherein the first paging time unit and the second paging time unit occur simultaneously.

7. The method of claim 2, wherein the first paging time unit and the second paging time unit are separated by a guard time.

8. The method of claim 1, further comprising negotiating, between a network node of the wireless communication network and the terminal device, the common paging occasion configuration.

9. The method of claim 1, wherein the setting of the common paging occasion configuration is further based on a stability of an internal clock of the terminal device.

10. The method of claim 1, further comprising instructing a radio access network node to page the terminal device according to the common paging occasion configuration at an exact time or within a specific time window.

11. The method of claim 1, wherein the common paging occasion configuration is set according to capabilities of the terminal device.

12. The method of claim 1, further comprising synchronizing of radio frame numbers across the first and second radio access technologies.

13. The method of claim 12, wherein the synchronizing of the radio frame numbers is based on an association of a first time unit in the first radio access technology with a second time unit in the second radio access technology divided by an integer number.

14. The method of claim 13, wherein the synchronizing of the radio frame numbers is further based on equal radio frame cycles in both the first and second radio access technology, or is further based on a same number of radio frames in both radio frame cycles of the first and second radio access technology.

15. The method of claim 1, further comprising reporting, to the terminal device, radio frame number differences between the first and second radio access technologies.

16. A method in a terminal device accessible via at least a first and second type of wireless radio accesses operating with different radio access technologies, wherein the method comprises:

obtaining a common paging occasion configuration setting for the at least the first and second radio access technologies, wherein the common paging occasion configuration setting is based on a difference in radio frame length between the first and second radio access technologies; and operating the terminal device to receive a paging via the first and/or the second radio access technologies according to the common paging occasion configuration.

17. The method of claim 16, further comprising transferring a stored common paging occasion configuration to a network node.

18. The method of claim 16, further comprising selecting whether to monitor only one or both of paging occasions defined by the first and second paging time units defined according to the common paging occasion configuration.

19. The method of claim 16, further comprising maintaining a clock to keep track of repetitively occurring common sleep periods of the common paging occasion configuration by associating a first time unit of the first radio access technology with a second time unit of the second radio access technology divided by an integer number.

* * * * *